United States Patent
Hoffman

(10) Patent No.: US 12,015,954 B2
(45) Date of Patent: Jun. 18, 2024

(54) METHOD AND APPARATUS FOR HANDOVER

(71) Applicant: NOKIA SOLUTIONS AND NETWORKS GMBH & CO. KG, Munich (DE)

(72) Inventor: Klaus Hoffman, Munich (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 333 days.

(21) Appl. No.: 17/290,974

(22) PCT Filed: Nov. 1, 2018

(86) PCT No.: PCT/EP2018/079934
§ 371 (c)(1),
(2) Date: May 3, 2021

(87) PCT Pub. No.: WO2020/088770
PCT Pub. Date: May 7, 2020

(65) Prior Publication Data
US 2022/0038959 A1    Feb. 3, 2022

(51) Int. Cl.
*H04W 36/00* (2009.01)
(52) U.S. Cl.
CPC .............................. *H04W 36/0005* (2013.01)
(58) Field of Classification Search
CPC ......... H04W 36/0005; H04W 36/0066; H04W 92/20
See application file for complete search history.

(56) References Cited

U.S. PATENT DOCUMENTS

2004/0190557 A1* 9/2004 Barron .................. H04L 69/161
710/22
2011/0063977 A1* 3/2011 Halfmann ......... H04W 28/0284
370/328

FOREIGN PATENT DOCUMENTS

WO    WO 2015/090363 A1    6/2015
WO    WO 2020/088770 A1    5/2020

OTHER PUBLICATIONS

Ericsson et al., "XN Handover with E1", 3GPP TSG RAN WG3 Meeting #98, Tdoc R3-174810, (Nov. 27-Dec. 1, 2017), 8 pages.
Ericsson, "UP Version Handling", 3GPP TSG RAN WG3 Meeting #100 NR, R3-182749, (May 21-25, 2018), 3 pages.
"3rd Generation Partnership Project; Technical Specification Group Radio Access Network; NG-RAN; NR user plane protocol (Release 15)", 3GPP TS 38.425 v15.2.0, (Jun. 2018), 21 pages.

(Continued)

*Primary Examiner* — Mansour Oveissi
(74) *Attorney, Agent, or Firm* — Barta Jones, PLLC

(57) ABSTRACT

Systems and methods for causing control information to be sent from a source base station to a target base station via a user plane is provided. In a network that uses control plane and user plane separation, the systems and methods provided herein reduce time delays between handovers in the control plane and handovers in the user plane. The time delays are reduced by minimizing a duration of the handover preparation phase by sending control information with payload packets between network functions via in-band signaling in the user plane.

20 Claims, 17 Drawing Sheets

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 v16.0.0, (Sep. 2018), 410 pages.

"3rd Generation Partnership Project; Technical Specification Group Services and System Aspects; System Architecture for the 5G System; Stage 2 (Release 15)" 3GPP TS 23.501 v15.3.0, (Sep. 2018), 226 pages.

"3rd Generation Partnership Project; Technical Specification Group Services and System Aspects; Procedures for the 5G System; Stage 2 (Release 15)", 3GPP TS 23.502 v15.3.0, (Sep. 2018), 330 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 v15.3.0, (Sep. 2018), 358 pages.

"3rd Generation Partnership Project; Technical Specification Group Radio Access Network; NR; NR and NG-RAN Overall Description; Stage 2 (Release 15)", 3GPP TS 38.300 v15.3.1 (Oct. 2018), 92 pages.

"3rd Generation Partnership Project; Technical Specification Group Services and System Aspects; Architecture enhancements for control and user plane separation of EPC nodes; Stage 2 (Release 15)", 3GPP TS 23.214 v15.4.0 (Sep. 2018), 92 pages.

"3rd Generation Partnership Project; Technical Specification Group Core Network and Terminals; Interface between the Control Plane and the User Plane Nodes; Stage 3 (Release 15)", 3GPP TS 29.244 v15.3.0, (Sep. 2018), 189 pages.

"3rd Generation Partnership Project; Technical Specification Group Radio Access Network; NG-RAN; E1 Application Protocol (E1AP) (Release 15)", 3GPP TS 38.463 v15.1.0 (Sep. 2018), 152 pages.

"3rd Generation Partnership Project; Technical Specification Group Radio Access Network; Evolved Universal Terrestrial Radio Access Network (E-UTRAN); S1 Application Protocol (S1AP) (Release 15)" 3GPP TS 36.413 v15.3.0 , (Sep. 2018), 383 pages.

"3rd Generation Partnership Project; Technical Specification Group Services and System Aspects; Policy and charging control architecture (Release 15)", 3GPP TS 23.203 v15.4.0, (Sep. 2018), 262 pages.

"3rd Generation Partnership Project; Technical Specification Group Core Network and Terminals; 5G System; Access and Mobility Management Services; Stage 3 (Release 15)", 3GPP TS 29.518 v15.1.0, (Sep. 2018), 173 pages.

"3rd Generation Partnership Project; Technical Specification Group Core Network and Terminals; Non-Access-Stratum (NAS) protocol for 5G System (5GS); Stage 3 (Release 15)", 3GPP TS 24.501 v15.1.0, (Sep. 2018), 398 pages.

"3rd Generation Partnership Project; Technical Specification Group Core Network and Terminals; 5G System; Network Function Repository Services; Stage 3 (Release 15)", 3GPP TS 29.510 v15.1.0, (Sep. 2018).

International Search Report and Written Opinion for Patent Cooperation Treaty Application No. PCT/EP2018/079934 dated Dec. 12, 2018, 14 pages.

* cited by examiner

METHOD AND APPARATUS FOR HANDOVER

CROSS-REFERENCE TO RELATED APPLICATIONS

This application is a national phase entry of International Application No. PCT/EP2018/079934, filed Nov. 1, 2018, the entire contents of which are incorporated herein by reference.

FIELD

The present application relates to a method, apparatus, and computer program in particular but not exclusively related to methods, apparatus and computer programs used for handover.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprising means for: causing control information to be sent from a source base station to a target base station via a user plane.

The control information may comprise sequence number information.

The means may be for causing a request message to be sent from the source base station to the target base station via the control plane.

The means may be for receiving a request acknowledgment message at the source base station from the target base station.

The request message may comprise a handover request message and the request acknowledgement message may comprise a handover request acknowledgment message.

The means may be for causing the user plane of the source base station to send the control information in-band along with payload packets in the user plane to the target base station directly.

The means may be for causing the user plane of the source base station to send the control information in-band along with payload packets in the user plane to the target base station directly in response to receiving the request acknowledgment message from the target base station.

The means may be for causing an indication to be sent from the source base station to a network entity, wherein the indication provides information that the source base station supports sending of control information via the user plane.

According to another aspect, there is provided an apparatus comprising means for: receiving control information from a source base station at a target base station via a user plane.

The control information may comprise sequence number information.

The means may be for receiving packets of data with the control information from the source base station at the target base station via the user plane.

The means may be for receiving a request message from the source base station at the target base station via the control plane.

The means may be for causing a request acknowledgement message to be sent to the source base station from the target base station.

The request message may comprise a handover request message and the request acknowledgement message may comprise a handover request acknowledgment message.

The means may be for causing the user plane of the target base station to expect to receive control information in-band in the user plane.

The means may be for causing the user plane of the target base station to expect to receive control information in-band in the user plane in response to receiving the request message from the source base station.

The means may be for processing the control information and packets of data received via the user plane.

The control information may comprise sequence number information.

The means may be for at least one of: reordering the packets of data and removing duplicated packets of the packets of data.

The means may be for at least one of: reordering the packets of data and removing duplicated packets of the packets of data is performed in dependence on a count value.

According to another aspect, there is provided an apparatus comprising: at least one processor; and at least one memory including computer program code, the at least one memory and the computer program code configured to, with the at least one processor, cause the apparatus at least to perform: causing control information to be sent from a source base station to a target base station via a user plane.

The control information may comprise sequence number information.

The at least one memory and the computer program code may be configured to, with the at least one processor, cause the apparatus at least to perform: causing a request message to be sent from the source base station to the target base station via the control plane.

The at least one memory and the computer program code may be configured to, with the at least one processor, cause the apparatus at least to perform: receiving a request acknowledgment message at the source base station from the target base station.

The request message may comprise a handover request message and the request acknowledgement message may comprise a handover request acknowledgment message.

The at least one memory and the computer program code may be configured to, with the at least one processor, cause the apparatus at least to perform: causing the user plane of the source base station to send the control information in-band along with payload packets in the user plane to the target base station directly.

The at least one memory and the computer program code may be configured to, with the at least one processor, cause the apparatus at least to perform: causing the user plane of the source base station to send the control information in-band along with payload packets in the user plane to the target base station directly in response to receiving the request acknowledgment message from the target base station.

The at least one memory and the computer program code may be configured to, with the at least one processor, cause the apparatus at least to perform: causing an indication to be sent from the source base station to a network entity, wherein the indication provides information that the source base station supports sending of control information via the user plane.

According to another aspect, there is provided an apparatus comprising: at least one processor; and at least one memory including computer program code, the at least one memory and the computer program code configured to, with the at least one processor, cause the apparatus at least to perform: receiving control information from a source base station at a target base station via a user plane.

The control information may comprise sequence number information.

The at least one memory and the computer program code may be configured to, with the at least one processor, cause the apparatus at least to perform: receiving packets of data with the control information from the source base station at the target base station via the user plane.

The at least one memory and the computer program code may be configured to, with the at least one processor, cause the apparatus at least to perform: receiving a request message from the source base station at the target base station via the control plane.

The at least one memory and the computer program code may be configured to, with the at least one processor, cause the apparatus at least to perform: causing a request acknowledgement message to be sent to the source base station from the target base station.

The request message may comprise a handover request message and the request acknowledgement message may comprise a handover request acknowledgment message.

The at least one memory and the computer program code may be configured to, with the at least one processor, cause the apparatus at least to perform: causing the user plane of the target base station to expect to receive control information in-band in the user plane.

The at least one memory and the computer program code may be configured to, with the at least one processor, cause the apparatus at least to perform: causing the user plane of the target base station to expect to receive control information in-band in the user plane in response to receiving the request message from the source base station.

The at least one memory and the computer program code may be configured to, with the at least one processor, cause the apparatus at least to perform: processing the control information and packets of data received via the user plane.

The control information may comprise sequence number information.

The at least one memory and the computer program code may be configured to, with the at least one processor, cause the apparatus at least to perform: at least one of: reordering the packets of data and removing duplicated packets of the packets of data.

The at least one memory and the computer program code may be configured to, with the at least one processor, cause the apparatus at least to perform: at least one of: reordering the packets of data and removing duplicated packets of the packets of data is performed in dependence on a count value.

According to another aspect, there is provided a method comprising: causing control information to be sent from a source base station to a target base station via a user plane.

The control information may comprise sequence number information.

The method may comprise causing a request message to be sent from the source base station to the target base station via the control plane.

The method may comprise receiving a request acknowledgment message at the source base station from the target base station.

The request message may comprise a handover request message and the request acknowledgement message may comprise a handover request acknowledgment message.

The method may comprise causing the user plane of the source base station to send the control information in-band along with payload packets in the user plane to the target base station directly.

The method may comprise causing the user plane of the source base station to send the control information in-band along with payload packets in the user plane to the target base station directly in response to receiving the request acknowledgment message from the target base station.

The method may comprise causing an indication to be sent from the source base station to a network entity, wherein the indication provides information that the source base station supports sending of control information via the user plane.

According to another aspect, there is provided a method comprising: receiving control information from a source base station at a target base station via a user plane.

The control information may comprise sequence number information.

The method may comprise receiving packets of data with the control information from the source base station at the target base station via the user plane.

The method may comprise receiving a request message from the source base station at the target base station via the control plane.

The method may comprise causing a request acknowledgement message to be sent to the source base station from the target base station.

The request message may comprise a handover request message and the request acknowledgement message may comprise a handover request acknowledgment message.

The method may comprise causing the user plane of the target base station to expect to receive control information in-band in the user plane.

The method may comprise causing the user plane of the target base station to expect to receive control information in-band in the user plane in response to receiving the request message from the source base station.

The method may comprise processing the control information and packets of data received via the user plane.

The control information may comprise sequence number information.

The method may comprise at least one of: reordering the packets of data and removing duplicated packets of the packets of data.

The method may comprise at least one of: reordering the packets of data and removing duplicated packets of the packets of data is performed in dependence on a count value.

According to another aspect, there is provided a non-transitory computer readable medium comprising program instructions thereon for performing at least the following: causing control information to be sent from a source base station to a target base station via a user plane.

According to another aspect, there is provided a non-transitory computer readable medium comprising program instructions thereon for performing at least the following: receiving control information from a source base station at a target base station via a user plane.

According to another aspect, there is provided a computer program comprising instructions stored thereon for performing at least the following: causing control information to be sent from a source base station to a target base station via a user plane.

According to another aspect, there is provided a computer program comprising instructions stored thereon for performing at least the following: receiving control information from a source base station at a target base station via a user plane.

According to an aspect, there is provided an apparatus comprising means for: receiving a request acknowledgment message at a source base station from a target base station via the user plane.

The request acknowledgment message may be sent from the target base station to another network function which forwards the request acknowledgment message to the source base station.

The request acknowledgment message may comprise a handover request acknowledgment message.

The means may be for causing a handover command message to be sent to a user equipment from the source base station.

The means may be for causing a handover required message to be sent from a source base station to a source management function.

The means may be for, before causing a handover required message to be sent from a source base station to a source management function, causing a user plane of the source base station to expect a request acknowledgment message in-band in the user plane.

The means may be for comprise instructing a user plane of the source base station to expect an in-band handover request acknowledge message via the user plane to the source base station.

The means may be for causing an indication to be sent with the handover required message from the source base station to the source management function, wherein the indication provides information that the source base station supports a procedure whereby a control message can be provided via a user plane.

According to another aspect, there is provided an apparatus comprising means for: causing a request acknowledgment message to be sent from a target base station to a source base station via a user plane.

The means may be for receiving a request message from a target management function at the target base station via a control plane.

The request message may comprise a handover request message and the request acknowledgment message comprises a handover request acknowledgment message.

The means may be for receiving, with the request message, an indication that the target management function supports a procedure whereby a control message can be provided via a user plane.

The means may be for receiving, with the request message, an indication that direct forwarding of data should be used.

The means may be for instructing a user plane of the target base station to send an in-band handover request acknowledge message via the user plane to the source base station directly.

According to another aspect, there is provided an apparatus comprising means for: causing a request message to be transmitted from a source management function to a target management function via the control plane; and causing an indication, that the source management function and a source base station supports a procedure whereby a control message can be provided via a user plane, and an indication to perform direct data forwarding, to be forwarded with the request message to the target management function.

The means may be for receiving a request message from a source base station at the source management function via a control plane.

The means may be for selecting, after the receipt of the request message, the target management function.

The request message may be a handover required message.

According to another aspect, there is provided an apparatus comprising means for: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

The means may be for receiving a request message at the target management function from a source management function via the control plane.

The request message may comprise an indication that the source management function supports a procedure whereby a control message can be provided via a user plane and an indication to perform direct data forwarding.

The request message may be a handover request message.

According to another aspect, there is provided an apparatus comprising means for: receiving a request acknowledgment message via in-band signalling in the user plane at a source base station, via a target user plane function, from a target base station.

The means may be for on receipt of the request acknowledgment message, initiating indirect data forwarding to the target user plane function.

The request acknowledgment message may comprise a handover request acknowledgment message.

The means may be for causing a handover command message to be sent to a user equipment from the source base station.

The means may be for causing a handover required message to be sent from the source base station to a source management function.

The means may be for causing an information element to be sent from the source base station to a source management function with the handover required message.

The information element may comprise a base station transparent container.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The means may be for causing an indication to be sent with the handover required message from the source base station to the source management function, wherein the indication provides information that the source base station supports a procedure whereby a control message can be provided via a user plane.

According to another aspect, there is provided an apparatus comprising means for: causing a request acknowledgment message to be sent via in-band signalling in the user plane from a target base station, via a target user plane function, to a source base station.

The means may be for receiving a request message from a target management function at the target base station via a control plane.

The received request message may comprise an information element.

The information element may comprise a base station transparent container.

The base station transparent container may comprise a count value.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The means may be for evaluating the received information element such that the internet protocol address and tunnel endpoint identifier of where a source base station expects to receive in-band signalling from a target user plane function is determined.

The means may be for receiving, from the source base station, a count value at the target base station via the user plane.

The request message may comprise a handover request message and the request acknowledgment message comprises a handover request acknowledgment message.

The means may be for receiving, with the request message, an indication that the target management function supports a procedure whereby a control message can be provided via a user plane.

The means may be for receiving, with the request message, an indication that indirect data forwarding should be used.

According to another aspect, there is provided an apparatus comprising means for: causing, an indication that a source management function and a source base station support a procedure whereby a control message can be provided via a user plane and an indication to perform indirect data forwarding, to be forwarded with a request message to the target management function.

The indication that a source management function and a source base station support a procedure whereby a control message can be provided via a user plane may be forwarded only when both the source management function and a source base station support the procedure.

The means may be for receiving a handover required message from a source base station at the source management function via a control plane.

The means may be for receiving an information element from the source base station at the source management function with the handover required message.

The information element may comprise at least one of: a base station transparent container and the indication that that the source base station supports the procedure whereby a control message can be provided via a user plane.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The means may be for causing the request message to be forwarded to a target management function via the control plane.

The request message may be forwarded with the received information element.

The means may be for selecting, after the receipt of the request message, the target management function.

The request message may be a handover required message.

According to another aspect, there is provided an apparatus comprising means for: causing a first message comprising a session request and indirect forwarding indication message to be sent from a target management function to a user plane of a second network entity.

The means for causing a first message comprising a session request and indirect forwarding message to be sent from a target management function to a user plane of a second network entity may be via a control plane of a first network entity.

The means may be for receiving a request message at the target management function from a source management function.

The request message may comprise a forward relocation request message.

The means may be for checking, via an internal or external database, whether the second network entity supports a procedure whereby a control message can be provided via a user plane.

The means may be for causing a handover request message to be sent from the target management function to a target base station, wherein the handover request message is sent with an information element.

The information element may comprise a base station transparent container.

The base station transparent container may comprise at least one of an internet protocol address and tunnel endpoint identity information, wherein the at least one of the internet protocol address and tunnel endpoint identity information may be the interface point where the source base station expects to receive signalling information in the user plane from another network entity and that the source base station should expect to receive control messages in the user plane.

The means may be for causing the user plane of the second network entity to provide, to the target management function, information as to a location where the source base station expects to receive signalling in the user plane from a second network entity.

The means for causing the user plane of the second network entity to provide to the target management function, information as to a location where the source base station expects to receive signalling in the user plane from a second network entity may be via a third network entity.

The information may comprise at least one of: an internet protocol address of the expected location and a tunnel endpoint identity of the expected location.

The tunnel endpoint identity of the expected location may be used to update an interface been the second network entity and the target management function.

The information may be allocated to the second network entity by the first network entity.

According to another aspect, there is provided an apparatus comprising means for: causing a request acknowledgment message to be sent via in-band signalling in the user plane from a target user plane function to a source base station.

The request acknowledgment message may be sent with an information element.

The information element may comprise a base station transparent container.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The means may be for causing a first message comprising a session response and indirect forwarding indication response message to be sent from the target user plane function to a target management function.

The response message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The internet protocol address and tunnel endpoint identifier information where the target user plane function expects to receive in-band signalling from a target base station at a later point may be allocated by the target management function.

The means may be for receiving instructions from a network entity to forward data from a user plane of a target base station to a user plane of the source base station.

The means may be for receiving instructions from the network entity, wherein the instructions are such that the user plane function should expect an in-band message from the target base station and that the in-band message should be forwarded to the source base station.

According to another aspect, there is provided an apparatus comprising means for: receiving a first message comprising a session request and indirect forwarding indication message, from a target management function; and forwarding the first message to a target user plane function with a set of instructions.

The set of instructions are such that the user plane function may expect an in-band message from a target base station and that the in-band message may be forwarded to a source base station.

The means may be for receiving a second message comprising a session response and indirect forwarding indication response message from the target management function; and forwarding the second message to the target user plane function.

At least one of the first message and second message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The means may be for causing the internet protocol address and tunnel endpoint identifier information for where the target user plane function expects to receive in-band signalling from a target base station at a later point to be allocated; and causing the target user plane function to be informed of the allocation.

According to another aspect, there is provided an apparatus comprising: at least one processor; and at least one memory including computer program code, the at least one memory and the computer program code configured to, with the at least one processor, cause the apparatus at least to perform: receiving a request acknowledgment message at a source base station from a target base station via the user plane.

The request acknowledgment message may be sent from the target base station to another network function which forwards the request acknowledgment message to the source base station.

The request acknowledgment message may comprise a handover request acknowledgment message.

The at least one memory and the computer program code may be configured to, with the at least one processor, cause the apparatus at least to perform: causing a handover command message to be sent to a user equipment from the source base station.

The at least one memory and the computer program code may be configured to, with the at least one processor, cause the apparatus at least to perform: causing a handover required message to be sent from a source base station to a source management function.

The at least one memory and the computer program code may be configured to, with the at least one processor, cause the apparatus at least to perform: before causing a handover required message to be sent from a source base station to a source management function, causing a user plane of the source base station to expect a request acknowledgment message in-band in the user plane.

The at least one memory and the computer program code may be configured to, with the at least one processor, cause the apparatus at least to perform: instructing a user plane of the source base station to expect an in-band handover request acknowledge message via the user plane to the source base station.

The at least one memory and the computer program code may be configured to, with the at least one processor, cause the apparatus at least to perform: causing an indication to be sent with the handover required message from the source base station to the source management function, wherein the indication provides information that the source base station supports a procedure whereby a control message can be provided via a user plane.

According to another aspect, there is provided an apparatus comprising: at least one processor; and at least one memory including computer program code, the at least one memory and the computer program code configured to, with the at least one processor, cause the apparatus at least to perform: causing a request acknowledgment message to be sent from a target base station to a source base station via a user plane.

The at least one memory and the computer program code may be configured to, with the at least one processor, cause the apparatus at least to perform: receiving a request message from a target management function at the target base station via a control plane.

The request message may comprise a handover request message and the request acknowledgment message comprises a handover request acknowledgment message.

The at least one memory and the computer program code may be configured to, with the at least one processor, cause the apparatus at least to perform: receiving, with the request message, an indication that the target management function supports a procedure whereby a control message can be provided via a user plane.

The at least one memory and the computer program code may be configured to, with the at least one processor, cause the apparatus at least to perform: receiving, with the request message, an indication that direct forwarding of data should be used.

The at least one memory and the computer program code may be configured to, with the at least one processor, cause the apparatus at least to perform: instructing a user plane of the target base station to send an in-band handover request acknowledge message via the user plane to the source base station directly.

According to another aspect, there is provided an apparatus comprising: at least one processor; and at least one memory including computer program code, the at least one memory and the computer program code configured to, with the at least one processor, cause the apparatus at least to perform: causing a request message to be transmitted from a source management function to a target management function via the control plane; and causing an indication, that the source management function and a source base station support a procedure whereby a control message can be provided via a user plane, and an indication to perform direct data forwarding, to be forwarded with the request message to the target management function.

The at least one memory and the computer program code may be configured to, with the at least one processor, cause the apparatus at least to perform: receiving a request message from a source base station at the source management function via a control plane.

The at least one memory and the computer program code may be configured to, with the at least one processor, cause the apparatus at least to perform: selecting, after the receipt of the request message, the target management function.

The request message may be a handover required message to be forwarded to the target management function.

According to another aspect, there is provided an apparatus comprising: at least one processor; and at least one memory including computer program code, the at least one memory and the computer program code configured to, with the at least one processor, cause the apparatus at least to perform: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

The at least one memory and the computer program code may be configured to, with the at least one processor, cause the apparatus at least to perform: for receiving a request message at the target management function from a source management function via the control plane.

The request message may comprise an indication that the source management function supports a procedure whereby a control message can be provided via a user plane and an indication to perform direct data forwarding.

The request message may be a handover request message.

According to another aspect, there is provided an apparatus comprising: at least one processor; and at least one memory including computer program code, the at least one memory and the computer program code configured to, with the at least one processor, cause the apparatus at least to perform: receiving a request acknowledgment message via in-band signalling in the user plane at a source base station, via a target user plane function, from a target base station.

The at least one memory and the computer program code may be configured to, with the at least one processor, cause the apparatus at least to perform: on receipt of the handover request acknowledgment message, initiating indirect data forwarding to the target user plane function.

The request acknowledgment message may comprise a handover command message.

The at least one memory and the computer program code may be configured to, with the at least one processor, cause the apparatus at least to perform: causing a handover command message to be sent to a user equipment from the source base station.

The at least one memory and the computer program code may be configured to, with the at least one processor, cause the apparatus at least to perform: causing a handover required message to be sent from the source base station to a source management function.

The at least one memory and the computer program code may be configured to, with the at least one processor, cause the apparatus at least to perform: causing an information element to be sent from the source base station to a source management function with the handover required message.

The information element may comprise a base station transparent container.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The at least one memory and the computer program code may be configured to, with the at least one processor, cause the apparatus at least to perform: causing an indication to be sent with the handover required message from the source base station to the source management function, wherein the indication provides information that the source base station supports a procedure whereby a control message can be provided via a user plane.

According to another aspect, there is provided an apparatus comprising: at least one processor; and at least one memory including computer program code, the at least one memory and the computer program code configured to, with the at least one processor, cause the apparatus at least to perform: causing a request acknowledgment message to be sent via in-band signalling in the user plane from a target base station, via a target user plane function, to a source base station.

The at least one memory and the computer program code may be configured to, with the at least one processor, cause the apparatus at least to perform: receiving a request message from a target management function at the target base station via a control plane.

The received request message may comprise an information element.

The information element may comprise a base station transparent container.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The at least one memory and the computer program code may be configured to, with the at least one processor, cause the apparatus at least to perform: evaluating the received information element such that the internet protocol address and tunnel endpoint identifier of where a source base station expects to receive in-band signalling from a target user plane function is determined.

The at least one memory and the computer program code may be configured to, with the at least one processor, cause the apparatus at least to perform: receiving, from the source base station, a count value at the target base station via the user plane.

The request message may comprise a handover request message and the request acknowledgment message comprises a handover request acknowledgment message.

The at least one memory and the computer program code may be configured to, with the at least one processor, cause the apparatus at least to perform: receiving, with the request message, an indication that the target management function supports a procedure whereby a control message can be provided via a user plane.

The at least one memory and the computer program code may be configured to, with the at least one processor, cause the apparatus at least to perform: receiving, with the request message, an indication that indirect data forwarding should be used.

According to another aspect, there is provided an apparatus comprising: at least one processor; and at least one memory including computer program code, the at least one memory and the computer program code configured to, with the at least one processor, cause the apparatus at least to perform: causing, an indication that a source management function and a source base station support a procedure whereby a control message can be provided via a user plane and an indication to perform indirect data forwarding, to be forwarded with a request message to the target management function.

The indication that a source management function and a source base station support a procedure whereby a control message can be provided via a user plane may be forwarded only when both the source management function and a source base station support the procedure.

The at least one memory and the computer program code may be configured to, with the at least one processor, cause the apparatus at least to perform: receiving a handover required message from a source base station at the source management function via a control plane.

The at least one memory and the computer program code may be configured to, with the at least one processor, cause the apparatus at least to perform: receiving an information element from the source base station at the source management function with the handover required message.

The information element may comprise at least one of: a base station transparent container and the indication that that the source base station supports the procedure whereby a control message can be provided via a user plane.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The at least one memory and the computer program code may be configured to, with the at least one processor, cause the apparatus at least to perform: causing the request message to be forwarded to a target management function via the control plane.

The request message may be forwarded with the received information element.

The at least one memory and the computer program code may be configured to, with the at least one processor, cause the apparatus at least to perform: selecting, after the receipt of the request message, the target management function.

The request message may be a handover required message.

According to another aspect, there is provided an apparatus comprising: at least one processor; and at least one memory including computer program code, the at least one memory and the computer program code configured to, with the at least one processor, cause the apparatus at least to perform: causing a first message comprising a session request and indirect forwarding indication message to be sent from a target management function to a user plane of a second network entity.

The at least one memory and the computer program code may be configured to, with the at least one processor, cause the apparatus at least to perform: causing a first message comprising a session request and indirect forwarding message to be sent from a target management function, via a control plane of a first network entity, to a user plane of a second network entity.

The at least one memory and the computer program code may be configured to, with the at least one processor, cause the apparatus at least to perform: receiving a request message at the target management function from a source management function.

The request message may comprise a forward relocation request message.

The at least one memory and the computer program code may be configured to, with the at least one processor, cause the apparatus at least to perform: checking, via an internal or external database, whether the second network entity supports a procedure whereby a control message can be provided via a user plane.

The at least one memory and the computer program code may be configured to, with the at least one processor, cause the apparatus at least to perform: causing a handover request message to be sent from the target management function to a target base station, wherein the handover request message is sent with an information element.

The information element may comprise a base station transparent container.

The base station transparent container may comprise at least one of an internet protocol address and tunnel endpoint identity information, wherein the at least one of the internet protocol address and tunnel endpoint identity information may be the interface point where the source base station expects to receive signalling information in the user plane from another network entity and that the source base station should expect to receive control messages in the user plane.

The at least one memory and the computer program code may be configured to, with the at least one processor, cause the apparatus at least to perform: causing the user plane of the second network entity to provide, to the target management function, information as to a location where the source base station expects to receive signalling in the user plane from a second network entity.

The at least one memory and the computer program code may be configured to, with the at least one processor, cause the apparatus at least to perform: causing the user plane of the second network entity to provide to the target management function, information as to a location where the source base station expects to receive signalling in the user plane from a second network entity via a third network entity.

The information may comprise at least one of: an internet protocol address of the expected location and a tunnel endpoint identity of the expected location.

The tunnel endpoint identity of the expected location may be used to update an interface been the second network entity and the target management function.

The information may be allocated to the second network entity by the first network entity.

According to another aspect, there is provided an apparatus comprising: at least one processor; and at least one memory including computer program code, the at least one memory and the computer program code configured to, with the at least one processor, cause the apparatus at least to perform: causing a request acknowledgment message to be sent via in-band signalling in the user plane from a target user plane function to a source base station.

The request acknowledgment message may be sent with an information element.

The information element may comprise a base station transparent container.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The at least one memory and the computer program code may be configured to, with the at least one processor, cause the apparatus at least to perform: causing a first message comprising a session response and indirect forwarding indication response message to be sent from the target user plane function to a target management function.

The response message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The internet protocol address and tunnel endpoint identifier information where the target user plane function expects to receive in-band signalling from a target base station at a later point may be allocated by the target management function.

The at least one memory and the computer program code may be configured to, with the at least one processor, cause the apparatus at least to perform: receiving instructions from a network entity to forward data from a user plane of a target base station to a user plane of the source base station.

The at least one memory and the computer program code may be configured to, with the at least one processor, cause the apparatus at least to perform: receiving instructions from the network entity, wherein the instructions are such that the user plane function should expect an in-band message from the target base station and that the in-band message should be forwarded to the source base station.

According to another aspect, there is provided an apparatus comprising: at least one processor; and at least one memory including computer program code, the at least one memory and the computer program code configured to, with the at least one processor, cause the apparatus at least to perform: receiving a first message comprising a session request and indirect forwarding indication message, from a target management function; and forwarding the first message a target user plane function with a set of instructions.

The set of instructions are such that the user plane function may expect an in-band message from a target base station and that the in-band message may be forwarded to a source base station.

The at least one memory and the computer program code may be configured to, with the at least one processor, cause the apparatus at least to perform: receiving a second message comprising a session response and indirect forwarding indication response message, from the target management function; and forwarding the first message to the target user plane function.

At least one of the first message and second message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The at least one memory and the computer program code may be configured to, with the at least one processor, cause the apparatus at least to perform: causing the internet protocol address and tunnel endpoint identifier information for where the target user plane function expects to receive in-band signalling from a target base station at a later point to be allocated; and causing the target user plane function to be informed of the allocation.

According to another aspect, there is provided a method comprising: receiving a request acknowledgment message at a source base station from a target base station via the user plane.

The request acknowledgment message may be sent from the target base station to another network function which forwards the request acknowledgment message to the source base station.

The request acknowledgment message may comprise a handover request acknowledgment message.

The method may comprise causing a handover command message to be sent to a user equipment from the source base station.

The method may comprise causing a handover required message to be sent from a source base station to a source management function.

The method may comprise before causing a handover required message to be sent from a source base station to a source management function, causing a user plane of the source base station to expect a request acknowledgment message in-band in the user plane.

The method may comprise instructing a user plane of the source base station to expect an in-band handover request acknowledge message via the user plane to the source base station.

The method may comprise causing an indication to be sent with the handover required message from the source base station to the source management function, wherein the indication provides information that the source base station supports a procedure whereby a control message can be provided via a user plane.

According to another aspect, there is provided a method comprising: causing a request acknowledgment message to be sent from a target base station to a source base station via a user plane.

The method may comprise receiving a request message from a target management function at the target base station via a control plane.

The request message may comprise a handover request message and the request acknowledgment message comprises a handover request acknowledgment message.

The method may comprise receiving, with the request message, an indication that the target management function supports a procedure whereby a control message can be provided via a user plane.

The method may comprise receiving, with the request message, an indication that direct forwarding of data should be used.

The method may comprise instructing a user plane of the target base station to send an in-band handover request acknowledge message via the user plane to the source base station directly.

According to another aspect, there is provided a method comprising: causing a request message to be transmitted from a source management function to a target management function via the control plane; and causing an indication, that the source management function and a source base station support a procedure whereby a control message can be provided via a user plane, and an indication to perform direct data forwarding, to be forwarded with the request message to the target management function.

The method may comprise receiving a request message from a source base station at the source management function via a control plane.

The method may comprise selecting, after the receipt of the request message, the target management function.

The request message may be a handover required message to be forwarded to the target management function.

According to another aspect, there is provided a method comprising: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

The method may comprise for receiving a request message at the target management function from a source management function via the control plane.

The request message may comprise an indication that the source management function supports a procedure whereby a control message can be provided via a user plane and an indication to perform direct data forwarding.

The request message may be a handover request message.

According to another aspect, there is provided a method comprising: receiving a request acknowledgment message via in-band signalling in the user plane at a source base station, via a target user plane function, from a target base station.

The method may comprise on receipt of the handover request acknowledgment message, initiating indirect data forwarding to the target user plane function.

The request acknowledgment message may comprise a handover command message.

The method may comprise causing a handover command message to be sent to a user equipment from the source base station.

The method may comprise causing a handover required message to be sent from the source base station to a source management function.

The method may comprise causing an information element to be sent from the source base station to a source management function with the handover required message.

The information element may comprise a base station transparent container.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The method may comprise causing an indication to be sent with the handover required message from the source base station to the source management function, wherein the indication provides information that the source base station supports a procedure whereby a control message can be provided via a user plane.

According to another aspect, there is provided a method comprising: causing a request acknowledgment message to be sent via in-band signalling in the user plane from a target base station, via a target user plane function, to a source base station.

The method may comprise receiving a request message from a target management function at the target base station via a control plane.

The received request message may comprise an information element.

The information element may comprise a base station transparent container.

The base station transparent container may comprise a count value.

The base station transparent container may comprise at least one of an internet protocol address and tunnel endpoint identity information, wherein the at least one of the internet protocol address and tunnel endpoint identity information being the interface point where the source base station expects to receive signalling information in the user plane from another network entity.

The method may comprise evaluating the received information element such that the internet protocol address and tunnel endpoint identifier of where a source base station expects to receive in-band signalling from a target user plane function is determined.

The method may be for receiving, from the source base station, a count value at the target base station via the user plane.

The request message may comprise a handover request message and the request acknowledgment message comprises a handover request acknowledgment message.

The method may comprise receiving, with the request message, an indication that the target management function supports a procedure whereby a control message can be provided via a user plane.

The method may comprise receiving, with the request message, an indication that indirect data forwarding should be used.

According to another aspect, there is provided a method comprising: causing, an indication that a source management function and a source base station support a procedure whereby a control message can be provided via a user plane and an indication to perform indirect data forwarding, to be forwarded with a request message to the target management function.

The indication that a source management function and a source base station support a procedure whereby a control message can be provided via a user plane may be forwarded only when both the source management function and a source base station support the procedure.

The method may comprise receiving a handover required message from a source base station at the source management function via a control plane.

The method may comprise receiving an information element from the source base station at the source management function with the handover required message.

The information element may comprise at least one of: a base station transparent container and the indication that that the source base station supports the procedure whereby a control message can be provided via a user plane.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The method may comprise causing the request message to be forwarded to a target management function via the control plane.

The request message may be forwarded with the received information element.

The method may comprise selecting, after the receipt of the request message, the target management function.

The request message may be a handover required message.

According to another aspect, there is provided a method comprising: causing a first message comprising a session request and indirect forwarding indication message, to be sent from a target management function, via a control plane of first network entity, to a user plane of a second network entity.

The method may comprise receiving a request message at the target management function from a source management function.

The request message may comprise a forward relocation request message.

The method may comprise checking, via an internal or external database, whether the second network entity supports a procedure whereby a control message can be provided via a user plane.

The method may comprise causing a handover request message to be sent from the target management function to a target base station, wherein the handover request message is sent with an information element.

The information element may comprise a base station transparent container.

The base station transparent container may comprise at least one of an internet protocol address and tunnel endpoint identity information, wherein the at least one of the internet protocol address and tunnel endpoint identity information may be the interface point where the source base station expects to receive signalling information in the user plane from another network entity and that the source base station should expect to receive control messages in the user plane.

The method may comprise causing the user plane of the second network entity to provide, to the target management function, information as to a location where the source base station expects to receive signalling in the user plane from a second network entity.

The information may comprise at least one of: an internet protocol address of the expected location and a tunnel endpoint identity of the expected location.

The tunnel endpoint identity of the expected location may be used to update an interface been the second network entity and the target management function.

The information may be allocated to the second network entity by the first network entity.

According to another aspect, there is provided a method comprising: causing a request acknowledgment message to be sent via in-band signalling in the user plane from a target user plane function to a source base station.

The request acknowledgment message may be sent with an information element.

The information element may comprise a base station transparent container.

The base station transparent container may comprise at least one of an internet protocol address and tunnel endpoint identity information, wherein the at least one of the internet protocol address and tunnel endpoint identity information are the interface point where the source base station expects to receive signalling information in the user plane from another network entity.

The method may comprise causing a first message comprising a session response and indirect forwarding indication response message, to be sent from the target user plane function to a target management function.

The response message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The internet protocol address and tunnel endpoint identifier information where the target user plane function expects to receive in-band signalling from a target base station at a later point may be allocated by the target management function.

The method may comprise receiving instructions from a network entity to forward data from a user plane of a target base station to a user plane of the source base station.

The method may comprise receiving instructions from the network entity, wherein the instructions are such that the user plane function should expect an in-band message from the target base station and that the in-band message should be forwarded to the source base station.

According to another aspect, there is provided a method comprising: receiving a first message comprising a session request and indirect forwarding indication message from a target management function; and forwarding the first message to a target user plane function with a set of instructions.

The set of instructions are such that the user plane function may expect an in-band message from a target base station and that the in-band message may be forwarded to a source base station.

The method may comprise receiving a second message comprising a session response and indirect forwarding indication response message from the target management function; and forwarding second message to the target user plane function.

At least one of first message and second message may comprise at least one of: uplink user data, an indirect target user plane function internet protocol address and a tunnel endpoint identifier, and internet protocol address and tunnel endpoint identifier information for where the target user plane function expects to receive in-band signalling from a target base station at a later point.

The method may comprise causing the internet protocol address and tunnel endpoint identifier information for where the target user plane function expects to receive in-band signalling from a target base station at a later point to be allocated; and causing the target user plane function to be informed of the allocation.

According to another aspect, there is provided a non-transitory computer readable medium comprising program instructions thereon for performing at least the following:

receiving a request acknowledgment message at a source base station from a target base station via the user plane.

According to another aspect, there is provided a non-transitory computer readable medium comprising program instructions thereon for performing at least the following: causing a request acknowledgment message to be sent from a target base station to a source base station via a user plane.

According to another aspect, there is provided a non-transitory computer readable medium comprising program instructions thereon for performing at least the following: causing a request message to be transmitted from a source management function to a target management function via the control plane; and causing an indication, that the source management function and a source base station support a procedure whereby a control message can be provided via a user plane, and an indication to perform direct data forwarding, to be forwarded with the request message to the target management function.

According to another aspect, there is provided a non-transitory computer readable medium comprising program instructions thereon for performing at least the following: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

According to another aspect, there is provided a non-transitory computer readable medium comprising program instructions thereon for performing at least the following: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

According to another aspect, there is provided a non-transitory computer readable medium comprising program instructions thereon for performing at least the following: receiving a request acknowledgment message via in-band signalling in the user plane at a source base station, via a target user plane function, from a target base station.

According to another aspect, there is provided a non-transitory computer readable medium comprising program instructions thereon for performing at least the following: causing a request acknowledgment message to be sent via in-band signalling in the user plane from a target base station, via a target user plane function, to a source base station.

According to another aspect, there is provided a non-transitory computer readable medium comprising program instructions thereon for performing at least the following: causing, an indication that a source management function and a source base station support a procedure whereby a control message can be provided via a user plane and an indication to perform indirect data forwarding, to be forwarded with a request message to the target management function.

The indication that a source management function and a source base station support a procedure whereby a control message can be provided via a user plane may be forwarded only when both the source management function and a source base station support the procedure.

According to another aspect, there is provided a non-transitory computer readable medium comprising program instructions thereon for performing at least the following: causing a first message comprising a session request and indirect forwarding indication request message to be sent from a target management function, via a control plane of first network entity, to a user plane of a second network entity.

According to another aspect, there is provided a non-transitory computer readable medium comprising program instructions thereon for performing at least the following: causing a request acknowledgment message to be sent via in-band signalling in the user plane from a target user plane function to a source base station.

According to another aspect, there is provided a non-transitory computer readable medium comprising program instructions thereon for performing at least the following: receiving a first message comprising a session request and indirect forwarding indication request message from a target management function; and forwarding the first message to a target user plane function with a set of instructions.

According to another aspect, there is provided a computer program comprising instructions stored thereon for performing at least the following: receiving a request acknowledgment message at a source base station from a target base station via the user plane.

According to another aspect, there is provided a computer program comprising instructions stored thereon for performing at least the following: causing a request acknowledgment message to be sent from a target base station to a source base station via a user plane.

According to another aspect, there is provided a computer program comprising instructions stored thereon for performing at least the following: causing a request message to be transmitted from a source management function to a target management function via the control plane; and causing an indication, that the source management function and a source base station support a procedure whereby a control message can be provided via a user plane, and an indication to perform direct data forwarding, to be forwarded with the request message to the target management function.

According to another aspect, there is provided a computer program comprising instructions stored thereon for performing at least the following: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

According to another aspect, there is provided a computer program comprising instructions stored thereon for performing at least the following: causing a request message to be sent from a target management function to a target base station via a control plane, wherein the request message comprises an indication that the target management function, a source management function and a source base station support a procedure whereby a control message can be provided via a user plane, and an indication to perform direct data forwarding.

According to another aspect, there is provided a computer program comprising instructions stored thereon for performing at least the following: receiving a request acknowledgment message via in-band signalling in the user plane at a source base station, via a target user plane function, from a target base station.

According to another aspect, there is provided a computer program comprising instructions stored thereon for performing at least the following: causing a request acknowledgment message to be sent via in-band signalling in the user plane from a target base station, via a target user plane function, to a source base station.

According to another aspect, there is provided a computer program comprising instructions stored thereon for performing at least the following: causing, an indication that a source management function and a source base station support a procedure whereby a control message can be provided via a user plane and an indication to perform indirect data forwarding, to be forwarded with a request message to the target management function.

According to another aspect, there is provided a computer program comprising instructions stored thereon for performing at least the following: causing a first message comprising a session request and indirect forwarding indication message to be sent from a target management function to a user plane of a second network entity.

According to another aspect, there is provided a computer program comprising instructions stored thereon for performing at least the following: causing a request acknowledgment message to be sent via in-band signalling in the user plane from a target user plane function to a source base station.

According to another aspect, there is provided a computer program comprising instructions stored thereon for performing at least the following: receiving a first message comprising a session request and indirect forwarding indication message from a target management function; and forwarding the first message to a target user plane function with a set of instructions.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

In general, the following disclosure relates to an example architecture, with associated apparatus, for a communication system. Some embodiments relate to an architecture and associated apparatus for a service based architecture with separate control and user planes.

A core network architecture may be service-based architecture (SBA), allowing some network functions (NFs), called NF service producers, to expose services to other authorized NFs, called NF service consumers, through a service-based interface.

Before explaining in detail the examples, certain general principles of a wireless communication system and mobile communication devices are briefly explained with reference to FIGS. 1 to 2 to assist in understanding the technology underlying the described examples.

Figure 1:
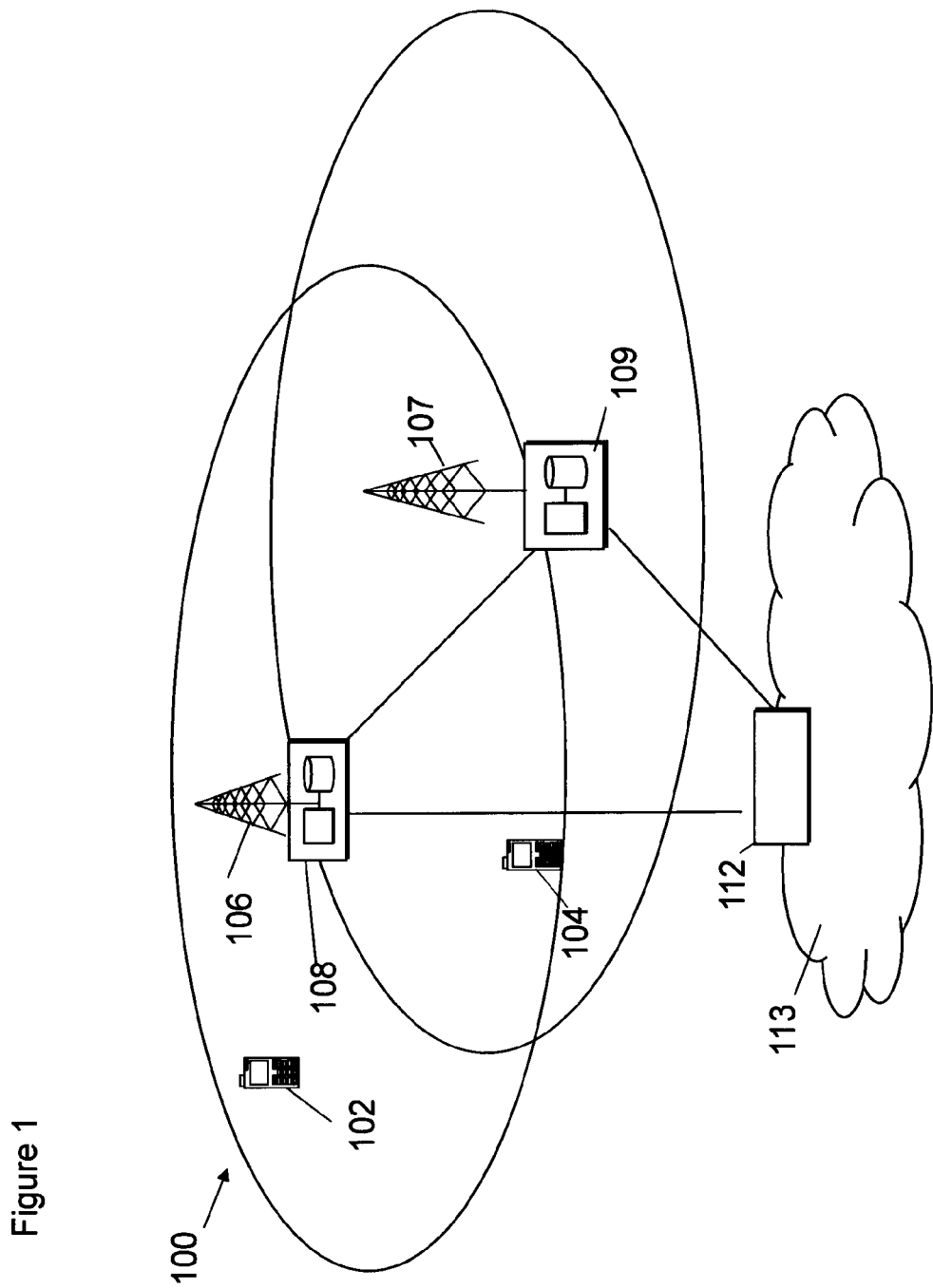
FIG. 1 shows a schematic diagram of an example communication system comprising a plurality of base stations and a plurality of communication devices.

In a wireless communication system 100, such as that shown in FIG. 1, mobile communication devices or user apparatus (UE) 102, 104 are provided wireless access via at least one base station or similar wireless transmitting and/or receiving node or point. A user can access the communication system by means of an appropriate communication device or terminal. A communication device of a user is may be a user equipment (UE) or a machine type terminal or any other suitable device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved.

A base station may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1, base stations 106 and 107 are shown as connected to a wider communications network 113 via a gateway 112. A further gateway function may be provided to connect to another network.

There may be smaller base stations or cells (not shown) in some networks. These may be pico or femto level base stations or the like.

Figure 2:
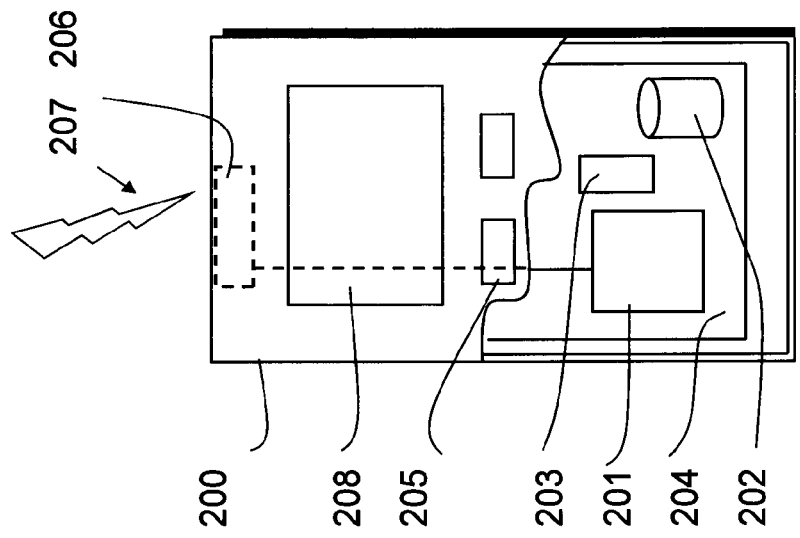
FIG. 2 shows a schematic diagram of an example communication device.

A possible communication device will now be described in more detail with reference to FIG. 2 showing a schematic, partially sectioned view of a communication device 200. Such a communication device may be a user equipment (UE) or terminal. An appropriate communication device may be provided by any device capable of sending and receiving radio signals. Non-limiting examples comprise a mobile station (MS) or mobile device such as a mobile phone or what is known as a smart phone, a computer provided with a wireless interface card or other wireless interface facility (e.g., USB dongle), personal data assistant (PDA) or a tablet provided with wireless communication capabilities, a machine type device or any combinations of these or the like.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. This may be optional in some embodiments.

A display 208, a speaker and a microphone can be also provided. One or more of these may be optional in some embodiments.

A communication device may comprise appropriate connectors (either wired or wireless) to other devices and/or for connecting external accessories, for example hands-free equipment, thereto. One or more of these may be optional.

The communication devices may access the communication system based on various access techniques.

An example of wireless communication systems are architectures standardized by the 3rd Generation Partnership Project (3GPP). A latest 3GPP based development is often referred to as 5G or New Radio (NR). The previous 3GPP based development is often referred to as 4G. Other examples of radio access system comprise those provided by base stations of systems that are based on technologies such as wireless local area network (WLAN) and/or WiMAX (Worldwide Interoperability for Microwave Access). It should be appreciate that although some embodiments are described in the context of a 4G and/or 5G system, other embodiments may be provided in any other suitable system including but not limited to subsequent systems or similar protocols defined outside the 3GPP forum.

Figure 3:
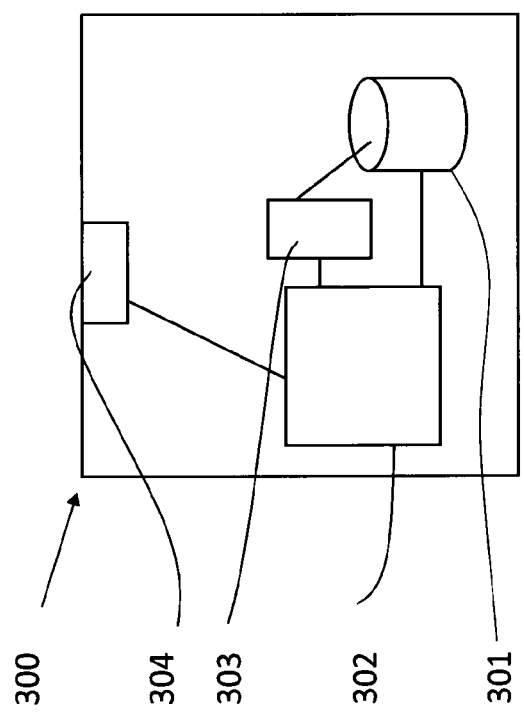
FIG. 3 shows a schematic diagram of an example network function.

An example apparatus is shown in FIG. 3. FIG. 3 shows an apparatus that could be comprised within a network function. As an example, the network function could be a base station, a management function, a serving gateway, a packet data network gateway, an access and mobility management function or a session management function. The apparatus 300 comprises at least one memory 301, at least one data processing unit 302, 303 and an input/output interface 304. For example the apparatus 300 can be configured to execute an appropriate software code to provide functions. The apparatus 300 may be included in a chipset apparatus.

It has been proposed to have control and user plane separation. This may enable flexible network deployment and operation, by distributed or centralized deployment. This may provide for the independent scaling between control plane and user plane functions, while not affecting the functionality of the existing nodes subject to this split.

Control and user plane separation of EPC nodes (CUPS) was introduced into 4G. CUPS is an architectural enhancement feature that introduces the concept of separation between control Plane and user Plane of EPC nodes (such as for example S-GW (serving gateway, P-GW (packet data network), & T-DF (traffic detection function)).

Figure 4:
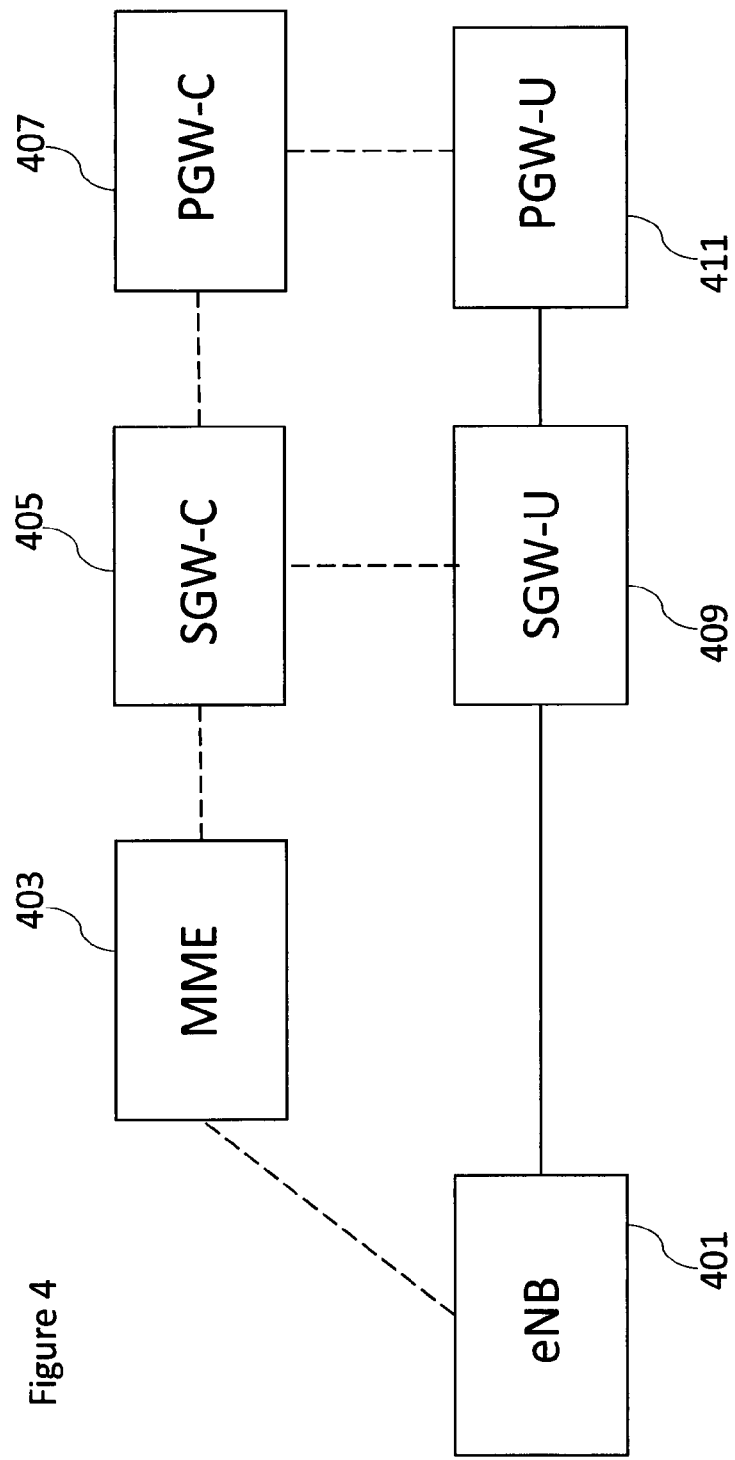
FIG. 4 shows a schematic diagram of a distributed services network.

An example architecture for such 4G system with CUPS is shown in FIG. 4.

The architecture shows a base station 401 (such as an evolved Node B eNB) which can communicate with a mobile mobility management entity (MME) 403. The base station 401 may be in communication with one or more user equipment (UEs) (not shown). The MME 403 can communicate with a control plane serving gateway 405 (SGW-C) function which in turn can communicate with both a control plane portable gateway 407 (PGW-C) function and a user plane serving gateway function 409 (SGW-U). The SGW-U function 409 is also connected to a user plane portable gateway function 411 (PGW-U). The PGW-C function 407 can communicate with the PGW-U 411 function.

Therefore, as seen in FIG. 4 the MME 403, the SGW-C and the PGW-C make up the control plane function, while the eNB 401, the SGW-U 409 and the PGW-U 411 make up the user plane function. The eNB 401 may consist of both user plane functions and control plane functions.

5G architecture has been proposed with the control plane and user plane separate. This may provide for greater flexibility and/or other network improvements.

The proposed 5G system supports a service based architecture. A service based architecture utilises a service based framework for a variety of communications-related processes, such as service registration, deregistration, discovery, selection, routing, etc. A service-based architecture is characterised by, instead of having predefined interfaces between network elements, using a services model in which components query a network function repository function (NRF) to discover and communicate with each other over application programming interfaces (APIs). An API is a function and/or procedure that supports an application which access the features or data of an operating system, application or other service.

To support this service architecture, a plurality of functional entities (also known as network functions, NFs) may be provided. Network functions may comprise one or more of:

Access and mobility management function (AMF): the AMF may provide features relating to UE-based authentication, authorisation, registration, mobility and connection management. The AMF may be independent of access technology type, and so a UE may be connected to an AMF regardless of the access technology used;

Network Repository Function (NRF): the NRF may support service discovery functions, maintain NF profiles and available NF instances.

Session Management function (SMF): the SMF may provide session management functions, including allocating Internet Protocol (IP) addresses to UEs. If a UE has multiple sessions, different SMFs may be allocated to each session to manage them individually;

Policy control function (PCF): the PCF may use information on the packet flow between two communicating entities to determine policies about mobility and session management for a given UE for the AMF and SMF to enforce this;

Unified data management function (UDM): the UDM may store subscription data for a UE, Application function (AF): the AF may provide information on the packet flow to the PCF for supporting quality of services; and Authentication server function (AUSF): the AUSF may support authentication of a UE.

It has been proposed that some network functions (NFs), called NF service producers, expose services to other authorized NFs, called NF service consumers, through a service-based interface.

Figure 5:
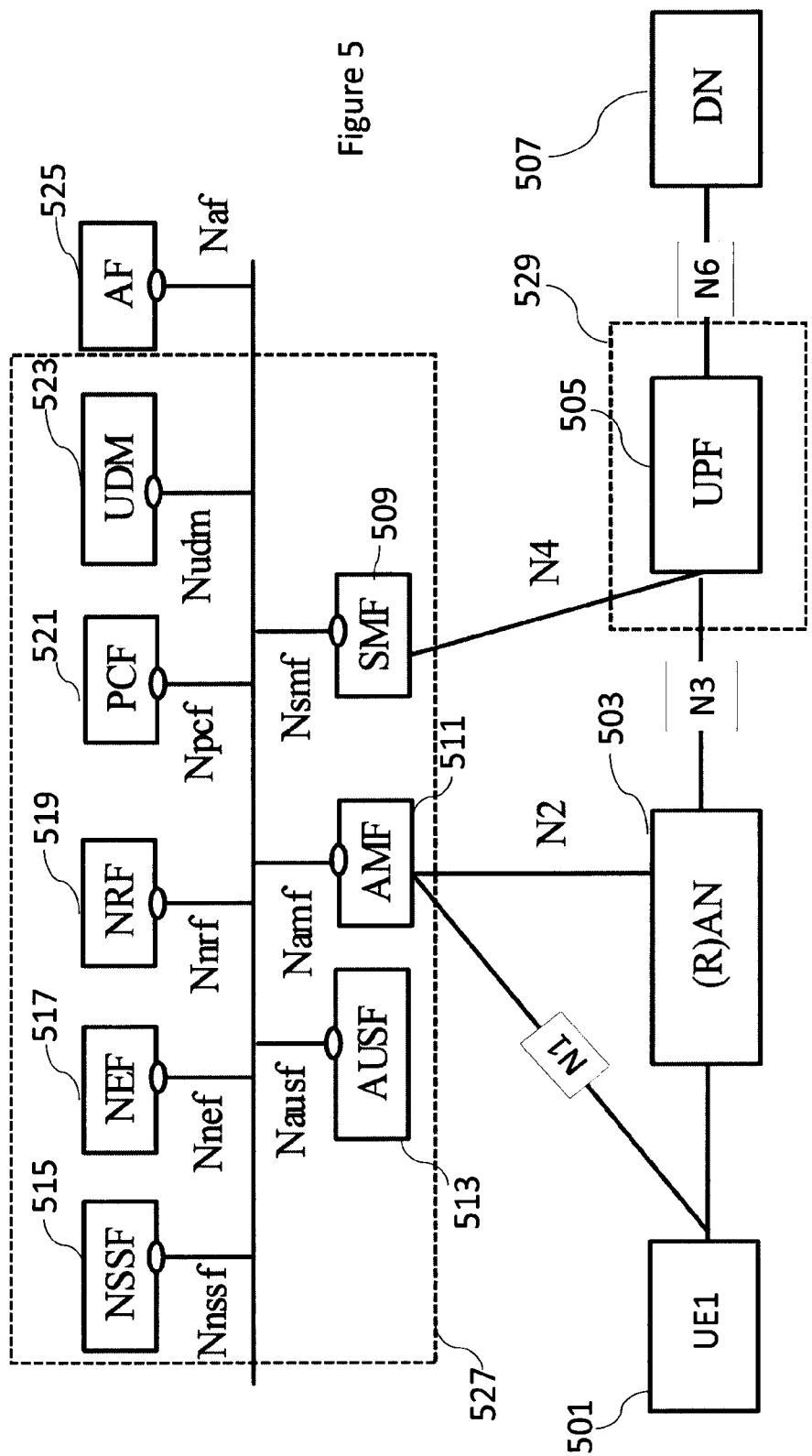
FIG. 5 shows a schematic diagram of another distributed services network.

An example architecture for such a services-based architecture is depicted in FIG. 5.

The architecture shows a user equipment (UE) 501 connected to a (radio) access network ((R) AN or 5G-AN) 503 at the access stratum, as well as an access and mobility management function (AMF) 511 at the non-access stratum. The RAN represents a base station.

The 5G core network (5GC) consists of various network functions (NFs) as discussed previously. In FIG. 5 there are ten 5G core NFs. An access and mobility management function (AMF) 511, a session management function (SMF) 509, a policy control function (PCF) 521, an application function (AF) 525, an authentication server function (AUSF) 513, a user plane function (UPF) 505, unified data management (UDM) 523, a NF repository function (NRF) 519, a network exposure function (NEF) 517 and a network slice selection function (NSSF) 515. A data network (DN) 507 is shown.

In FIG. 5 we see the following interfaces or references connecting the NFs:

N1 is the interface between the UE and the AMF.
N2 is the interface between the (R)AN and the AMF.
N3 is the interface between the (R)AN and the UPF.
N4 is the interface between the UPF and the SMF.
N6 is the interface between the UPF and the DN.

The NFs that are housed in the first dotted box 527 are the control plane functions of the 5G architecture. These NFs are the AUSF 513, the AMF 511, the SMF 509, the NSSF 515, the NEF 517, the NRF 519, the PCF 521 and the UDM 523. The NF housed in the second dotted box 529 is the user plane function of the 5G architecture. This NF is the UPF 505.

The UPF 505 is a user plane function. The RAN has both control plane and user plane functions.

It has been appreciated that issues may arise in networks which use control and user plane separation. For example, the time difference in delays between the handovers in the control plane and the handovers in the user plane can lead to additional buffering and packet loss in the system.

For example, in 4G architectures the MME 403 may be in a central data centre (DC). The MME 403 may be say 5 ms away from the eNB 401. Therefore for an S1 handover, the eNB Status Transfer message may take approximately 10 ms to travel from a source eNB (S-eNB) to the target eNB (T-eNB). However, the user plane functions (i.e. SGW-U and PGW-U) may be very close to each other, such as for example a 2 ms message delay. This means there may be time delay difference between the control plane and the user plane during handover.

As another example, in 5G architectures the AMF 511 may also be in a central data centre (DC). The AMF 511 may be 5 ms away from the RAN 503. Therefore for an N2 handover, the SN (sequence number) Status Transfer message may take approximately 10 ms to travel from a source RAN (S-RAN) to the target RAN (T-RAN). However, the UPFs may be very close to each other, such as for example having a 2 ms message delay. This means that there may be a time delay difference between control plane and user plane. This may be an issue the slicing concept in 5G systems whereby there may be one single AMF for all slices. The "SN status transfer" message may just be an example of a status transfer message. In other examples, the status transfer message may be an "MME/eNB Status transfer" message In these example, the information sent via the control plane in the sequence number (SN) status transfer, the eNB status transfer and/or the MME status transfer may, depending on the topology, arrive later at the user plane than the user plane packets. This may lead to packet loss and/or to additional buffering and corresponding delay. In some cases, such as low and ultra-low latency services this may be undesirable. This may result in the service requirement not being met.

Some embodiments may provide that the user plane and the control plane paths have the same delay by collocation of path and network functions.

In some embodiments, a time difference delay between the control plane (CP) and the user plane (UP) messages during a handover may be taken into account.

Some embodiments may be arranged to work in conjunction with legacy systems. For example if a network function is capable of supporting one or more embodiments, the network function may provide an indication of this. In some embodiments, the network functions participating in these procedures may indicate in the signalling messages that they are capable. For example, the base station or access node may signal and/or evaluate these indications. This may allow the differentiation of these one or more network functions from network functions which may be legacy versions and unable to support one or more embodiments.

It should be appreciated that in some embodiments, there may be no need to provide support for any legacy functions.

In order to reduce the duration of the handover preparation phase, in embodiments, a target RAN, in the case of direct data forwarding, does not send a handover request acknowledgment message via the control plane of the AMF, but instead via in-band signalling in the user plane to the user plane of a source S-RAN directly. This procedure will be discussed in more detail below with reference to FIG. 10.

Figure 10:
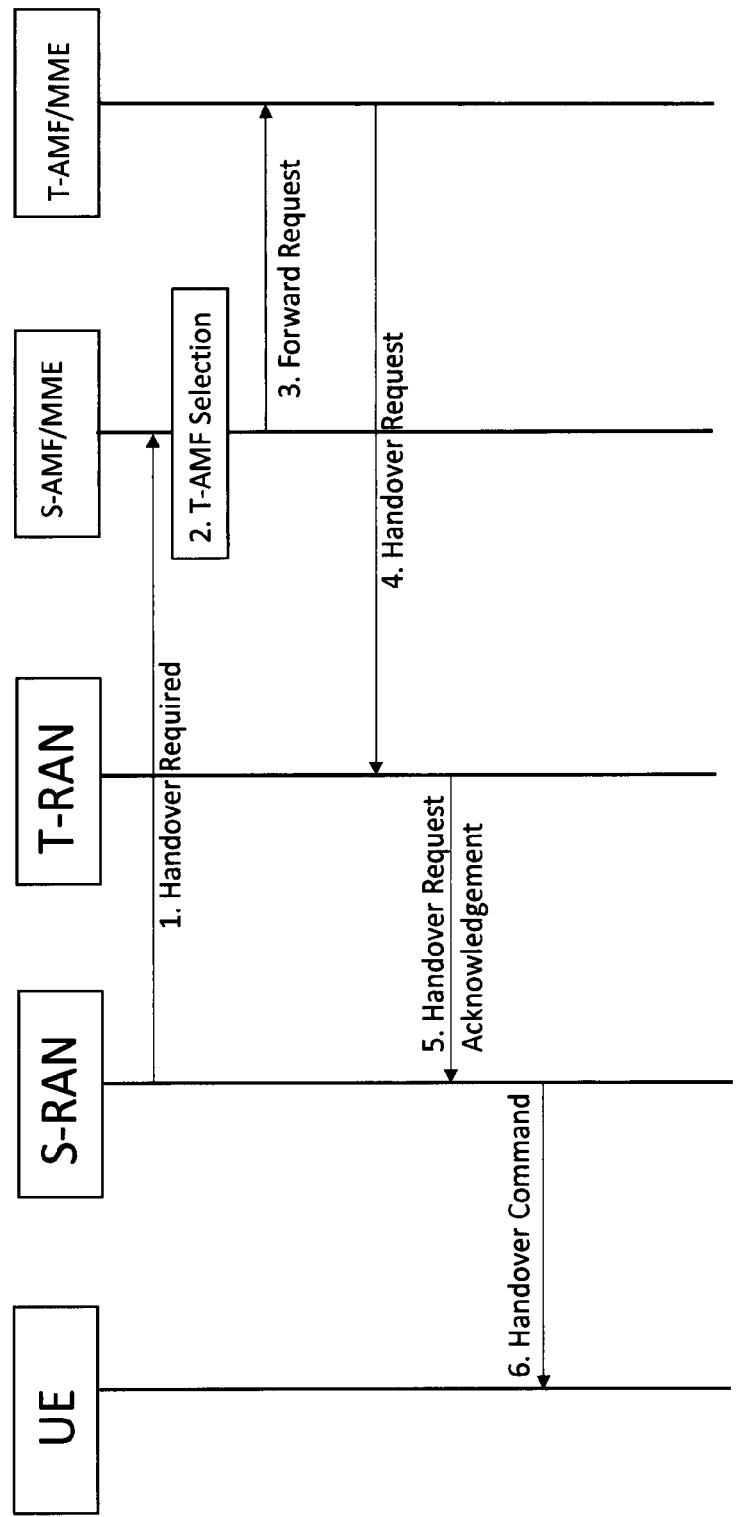
FIG. 10 shows an example signalling diagram between network functions.

FIG. 10 shows an example signalling diagram between network functions during a preparation phase of a handover. The procedure as shown in FIG. 10 may minimize the duration of preparation phase for, for example, an S1 or N2 handover with direct data forwarding. An S1 handover may be a handover in, for example, a 4G network. An N2 handover may be a handover in, for example, a 5G network. In the case of an S1 handover, the relevant entity is the MME and in the case of an N2 handover, the relevant entity is the AMF. It should be appreciated that the RAN or base station may be referred to by another name in other 3GPP systems such as, for example, an eNB or a gNB.

At step 1, an S-RAN provides a handover required message to an S-AMF (or S-MME). In some examples, the S-RAN may signal an indication to the S-AMF (or S-MME) that it supports the current procedure, of a minimized preparation phase for handover/supports the procedure sending of control information via the user plane.

On receipt of the handover required message, the S-AMF (or S-MME), may select a T-AMF (or T-MME) as shown in step 2. In some embodiments, the handover required message may specify a T-RAN to use for the handover, rather than the S-AMF (or S-MME) selecting it.

As shown in step 3, on receipt of the handover required message, the S-AMF (or S-MME) may signal support of the procedure of a minimized preparation phase and of direct data forwarding to the T-AMF (or T-MME). In some embodiments, the forwarding of the request to the T-AMF may be in the form of a Namf_Communication_CreateUE-Context Request message.

At step 4, the T-AMF (or T-MME) may transmit a handover request message to a T-RAN. The T-AMF (or T-MME) also provides an indication that the T-AMF (or T-MME) supports the procedure of a minimized preparation phase, and/or a direct forwarding indication to the T-RAN.

As shown in step 5, if the T-RAN also supports the procedure of a minimized preparation phase, on receipt of the direct forwarding indication with the handover request message, the T-RAN provides a handover request acknowledgment message to the S-RAN directly (via the user plane). In other examples, the handover request acknowledgment message may be a handover command message.

At step 6, the S-RAN provides a handover command message to a communication device. Therefore, the S-RAN continues as if the handover command message was received via the control plane interface rather than from the T-RAN directly.

The procedure as shown in FIG. 10 may be used in some embodiments if the S-RAN and/or the T-RAN were split into a user plane and a control plane. This is now described in more detail.

In some embodiments, one or more of following signalling changes to FIG. 10 may occur if the S-RAN was split into an S-RAN-C and an S-RAN-U.

Before sending the handover required message to the S-AMF, the S-RAN-C may instruct the S-RAN-U to expect and accept a handover request acknowledge message or a handover request message in-band in the user plane at a later stage of the handover procedure.

An E1 interface may be augmented such that the handover request acknowledge message or the handover request message may be reported to the S-RAN-C. The E1 interface is point-to-point interface within a RAN, between the RAN central unit (CU) control plane and the RAN CU user plane. In response, the S-RAN-C may provide the handover request message at the communication device and the handover may continue for example, in accordance with a legacy procedure.

In some embodiments, one or more of the following signalling changes to FIG. 10 may occur if the T-RAN was split into a T-RAN-C and a T-RAN-U. On receipt of the handover request message at the T-RAN-C (T-RAN in FIG. 10) with the indication that the procedure of a minimized preparation phase is supported by the remote side and direct data forwarding within the indication is to be applied, the T-RAN-C builds the parameter(s) for the handover request acknowledge. Instead of providing a control plane message to the AMF (or MME), it provides this to the T-RAN-U and instructs the T-RAN-U to send an in-band handover request acknowledgement or handover command message via the user plane towards the S-RAN-U directly. In some embodiments, the E1 interface may be such that the handover request acknowledge message or handover request message may be possible to be sent from the T-RAN-C to the T-RAN-U for transmission to the S-RAN-U.

In some embodiments, there may be a difference in signalling at the AMF (or T-MME) if the network functions were split into user and control plane functions. The AMF (or MME) may know that if support for the procedure of minimizing the preparation phase and for direct data forwarding is there, then there will be no more handover request messages being sent from the T-RAN to the T-AMF (or T-MME). Therefore, in this case, the T-AMF (or T-MME) may only supervise the successful receipt of a handover notify message being sent from the T-RAN to the AMF (or MME), which indicates that handover had been performed successfully. However, if the handover notify message is missing/not received then error handling may still be applied by the AMF (or MME).

By applying the procedure as shown in FIG. 10, whether the S-RAN/T-RAN is split into control and user plane functions or not, the procedure may reduce or minimize the duration of the preparation phase for a handover. The handover phase may be reduced as the control signalling travels with the payload packets, which may be the shortest path. It may be the shortest path as it is at least as short as needed by the service requested by the UE, whereas the control plane path might be longer.

The duration of the preparation phase may be reduced from about twice or more the duration of the control plane delay between the S-RAN via the S-AMF (or S-MME) via the T-AMF (or T-MME) to the T-RAN, to about half of this plus the user plane delay between S-RAN and T-RAN. That is because the distance between the S-RAN and the T-RAN may be negligible in some examples.

In the case where AMF/MMEs are placed in a centralized DC, this may be twice the control plane delay between RAN and AMF/MMEs. The same principal may be applied for X2 and Xn handover procedures as well. X2 and Xn are the interfaces between two bases stations for 4G and 5G respectively.

In the case of URLCC with maximum delay requirements between 2 ms to 10 ms this procedure as shown in FIG. 10 may provide an improved performance in some embodiments.

Furthermore, it is possible to have two incompatible slices such as, for example, ultra-reliable low latency and enhanced mobile broadband in a 5G network while simultaneously providing a best user experience for, for example, real time gaming.

It is noted that FIG. 10 may not show all of the steps required for a handover and other embodiments may require one or more further steps and/or a modification of one or more the steps discussed.

Some of the signalling between network functions has been omitted for clarity.

The use of the RAN and AMF are simply 5G examples and other function from other 3GPP developments or non-3GPP developments may be suitable for this procedure.

Furthermore, E1 is used simply as an example, the N4 interface (between the SMF and UPF) and/or an Sx interface (between the control plane and user plane of SGW, PGW or TDF) may also be suitable for example.

Figure 11:
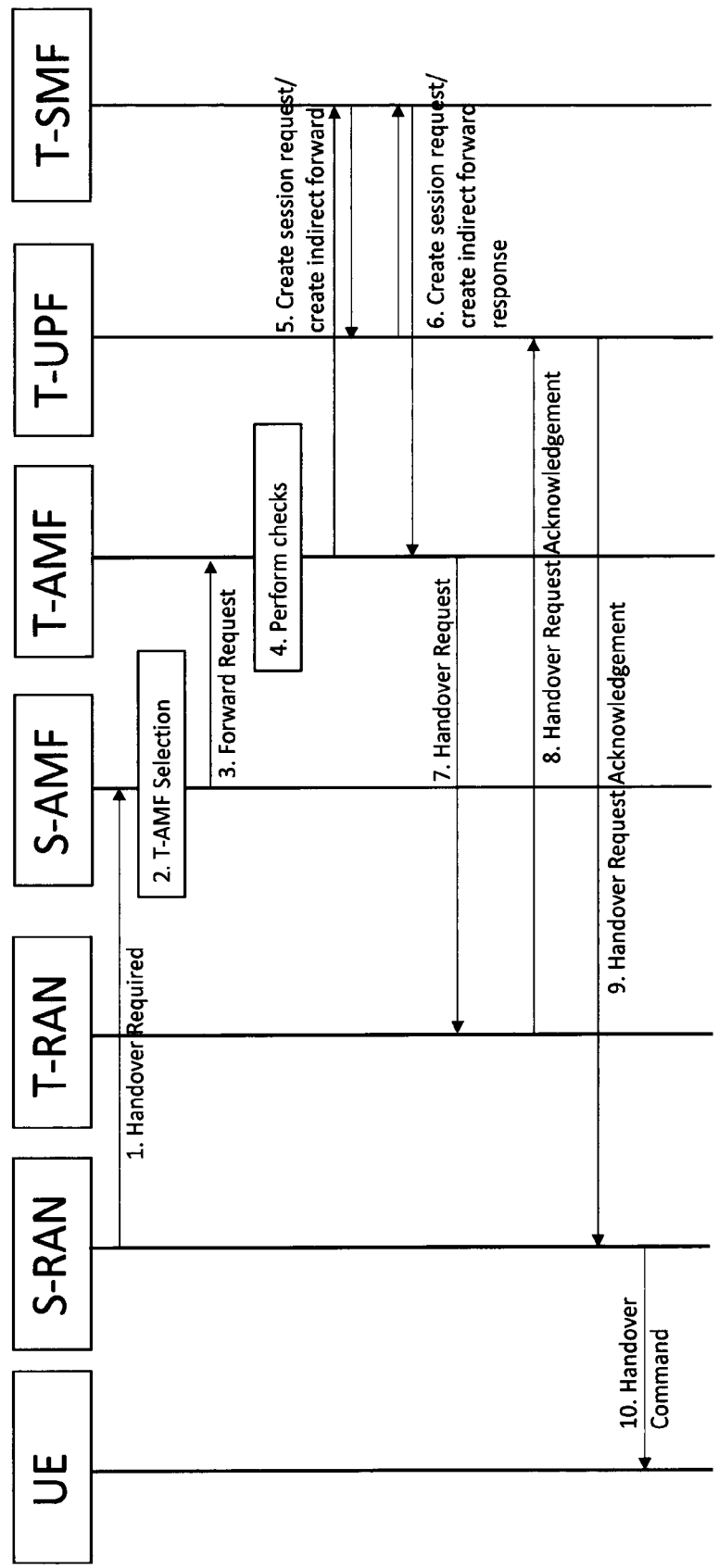
FIG. 11 shows an example signalling diagram between network functions.
Figure 14A:
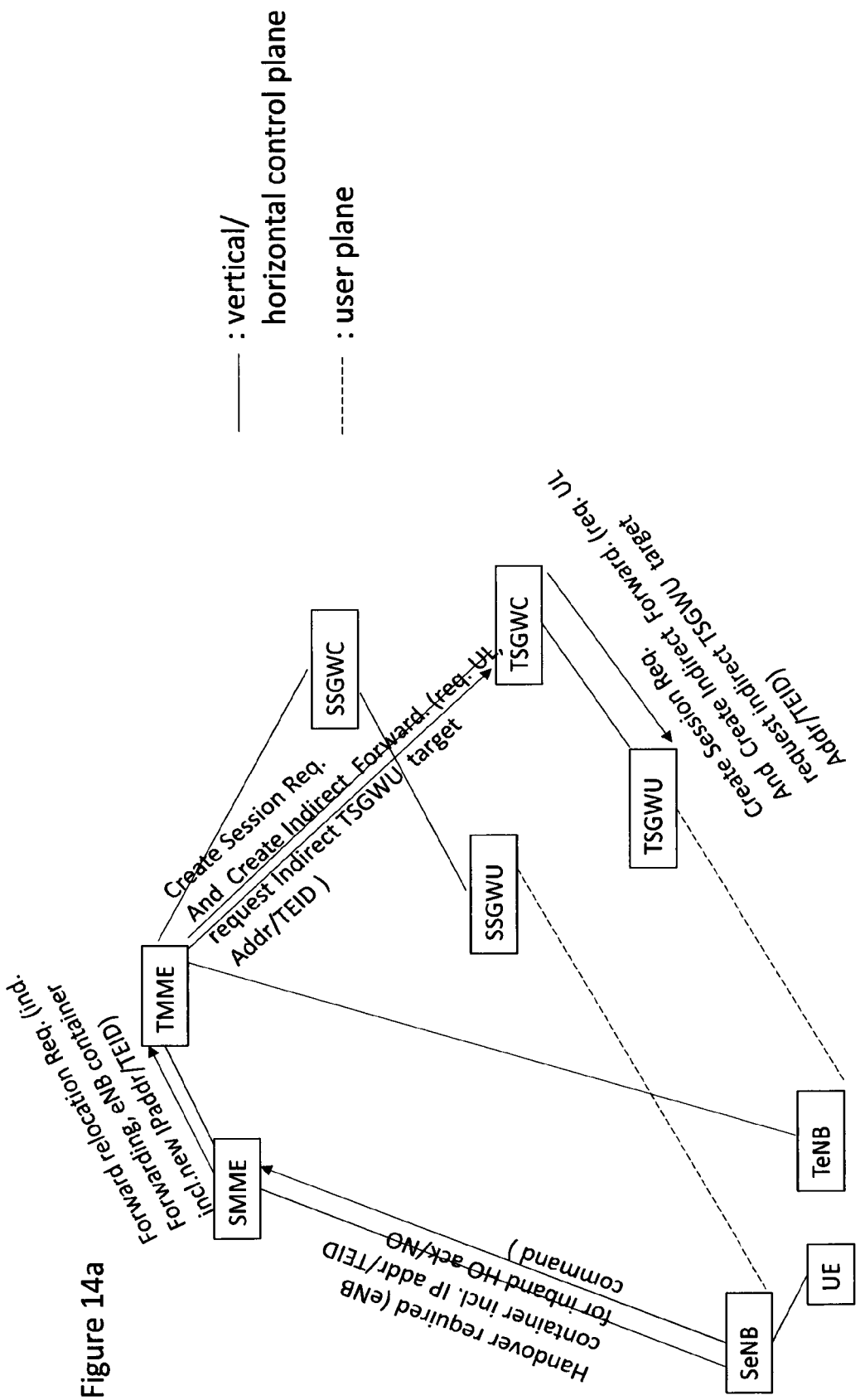
FIGS. 14*a* and 14*b* show the handover preparation with indirect data forwarding in a 4G network.
Figure 14B:
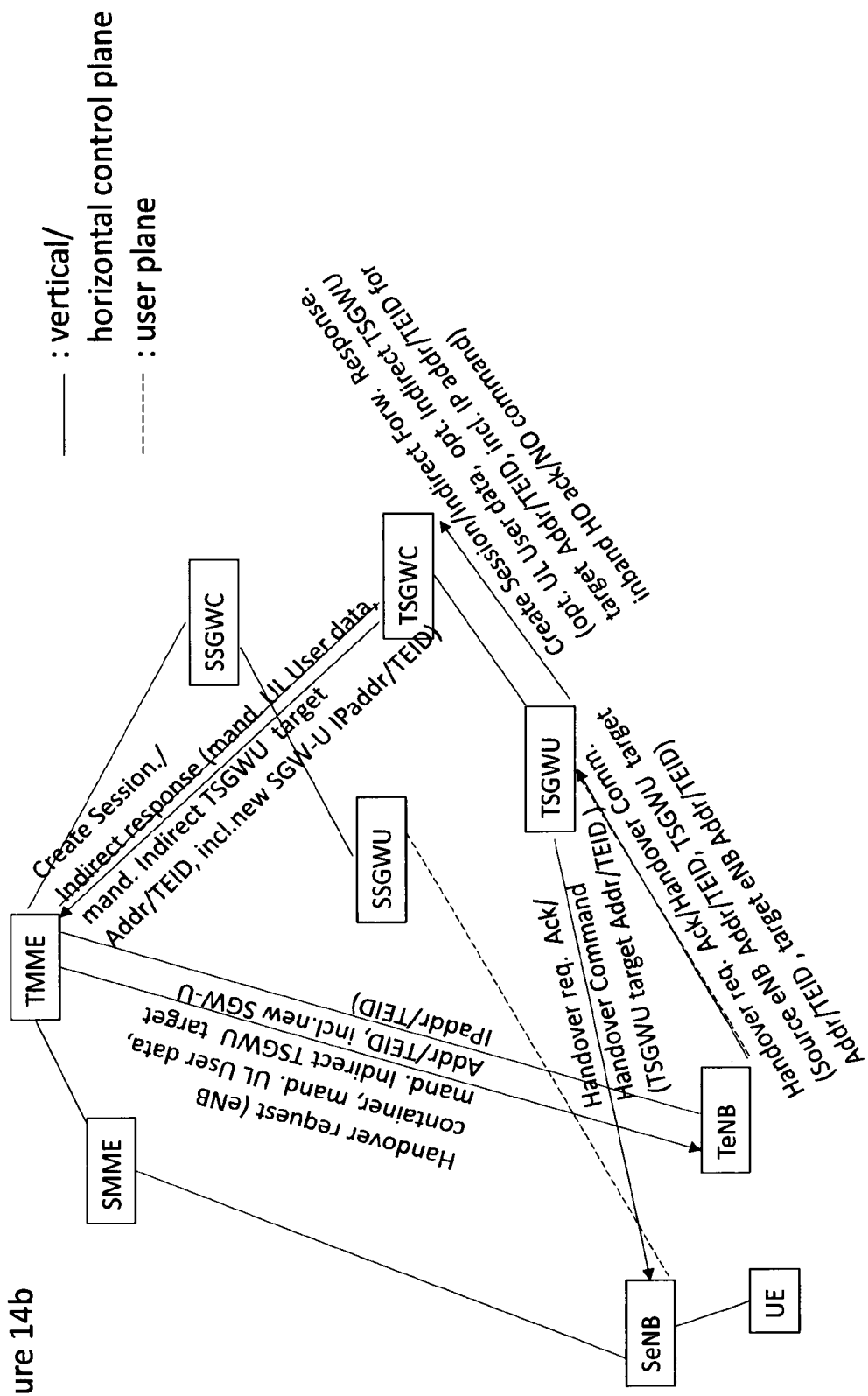
Figure 14C:
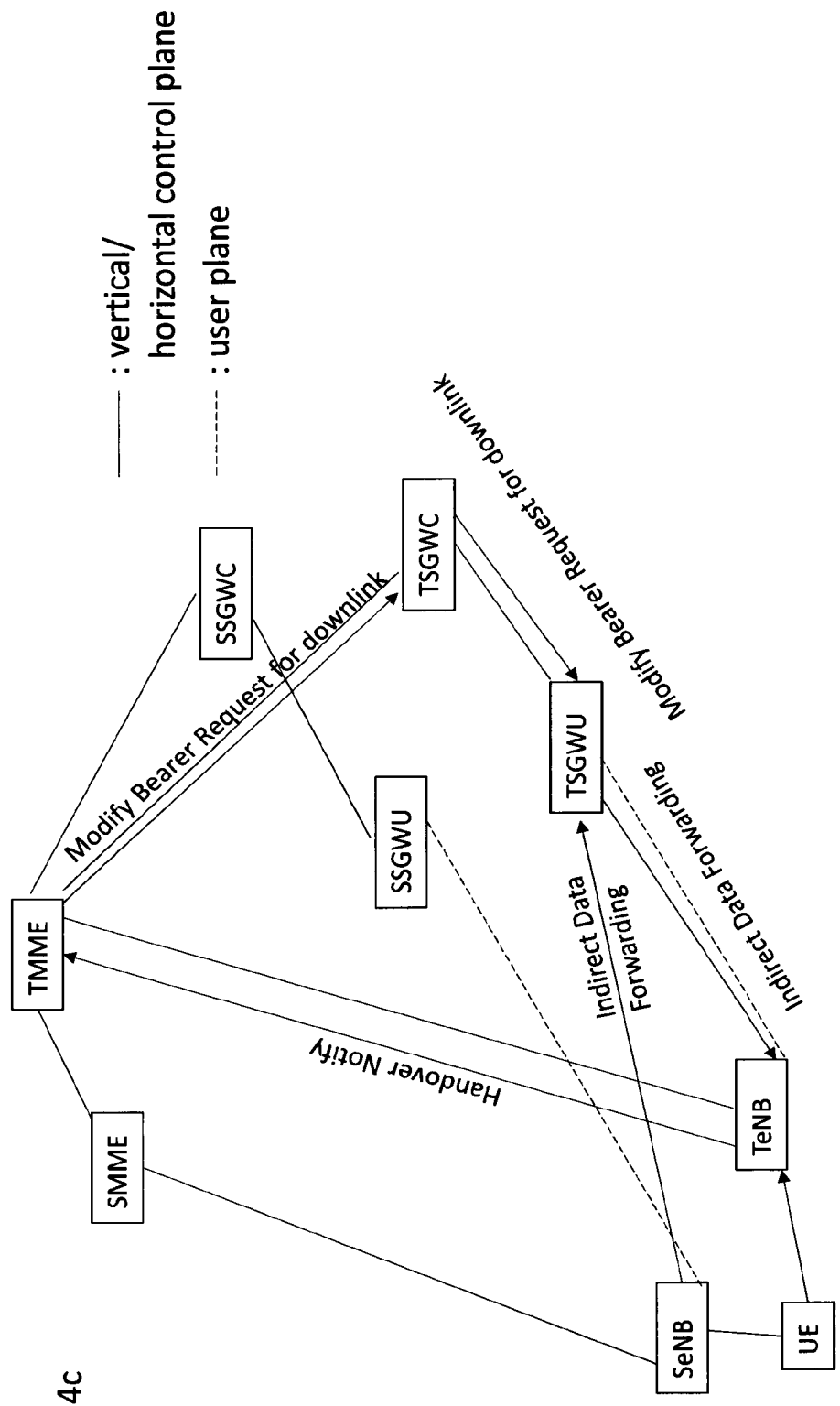
FIG. 14*c* show handover execution with indirect data forwarding in a 4G network.

FIG. 11 shows an example signalling diagram between network functions during a preparation phase of a handover in the context of a 5G network. The procedure as shown in FIG. 11 may minimize the duration of preparation phase for, for example, an N2 handover with indirect data forwarding. FIGS. 14a to 14c describe a similar procedure in the context of a 4G network. FIGS. 14a to 14c are described later.

FIG. 11 will now be described. As shown in step 1, if a handover is to be triggered an S-RAN provides a handover required message to an S-AMF. The S-RAN may also signal support of this procedure of a minimized preparation phase to the S-AMF in the handover required message. This indication may be an implicit or explicit indication of support for the procedure of a minimized preparation phase.

The S-RAN may provide an RAN transparent container within the message. The S-RAN may insert an IP address and fully qualified tunnel endpoint identifier (TEID) information element into the RAN transparent container, for example a source eNB to target eNB transparent container. The IP address and TEID information element may be part of, for example, an E-UTRAN radio access bearer (E-RAB) information item or similar information item. This IP address and TEID information element may be the interface point where the S-RAN expects to receive signalling information (in the user plane) from a remote partner.

At step 2, the S-AMF may select a T-AMF. In other examples, the handover control message may include a T-AMF selection for the handover, such that the S-AMF does not need to make a selection.

At step 3, on receipt of the handover required message at the S-AMF, the S-AMF may provide an indication that the S-AMF supports the procedure of a minimized preparation phase. The S-AMF may provide an indication of indirect data forwarding to the T-AMF via, for example, a forwarding of the handover required message together with the RAN transparent container.

In some embodiments, the S-AMF may provide the T-AMF with an Namf_Communication_CreateUEContext request message with the indication that the S-AMF supports the procedure of a minimized preparation phase and the indication of indirect data forwarding.

At step 4, on receipt of the handover required message at the T-AMF, instead of immediately sending of a handover request message to a T-RAN, the T-AMF checks whether a T-UPF and/or S-UPF supports the procedure of a minimized preparation phase. This may be via, for example, an internal database or external database, e.g. an NRF in a 5G architecture, or in any other suitable manner.

If the T-UPF/S-UPF do support the procedure of minimized preparation phase, then the T-AMF may provide a combined create session request and create indirect forwarding indication message to the T-UPF via a T-SMF This is shown in step 5. In some examples the SMF will not change during handover. If the SMF does not change during handover then there will only be one SMF, rather than an S-SMF and a T-SMF. The combined message sent from the T-AMF to the target SMF may have two functions: one is the selection of T-SMF (and the other may be to instruct the T-UPF via the T-SMF to allocate a "tunnel" endpoint/ address where the T-UPF should expect to receive in band messages which may be sent at a later stage by the T-RAN) and which the T-UPF shall send to the S-RAN. The combined message may alternatively or additionally include a request for the uplink address of the T-UPF and a request for the indirect T-UPF IP address and TEID The step of checking whether the T-UPF/S-UPF supports the procedure may be similar to an NRF query. The NRF (Network function Repository Function) procedures are specified in 3GPP TS 29.510. In general the NRF allows NF to discover other NFs and to recognize their capabilities.

In the existing 3GPP procedure these two messages (the create session request and the create indirect forwarding indication message) are sent separately which may create an additional delay for the handover procedure.

As shown in step 6, on receipt of the combined create session request message and create indirect forward message, the T-UPF acknowledges the message and responds with the uplink address of the T-UPF, the IP address and TEID for the indirect T-UPF, to the T-AMF via the T-SMF. The T-UPF may add its own IP Address and/or TEID into the acknowledgment message. This may be for embodiments where the T-UPF expects to receive a handover request acknowledgement message or a handover command message from a T-RAN.

As shown in step 7, on receipt of the combined message at the T-AMF, the T-AMF provides a handover request message with the RAN transparent container, the uplink user data and the indirect T-UPF target IP Address and/or TEID, to the T-RAN. The handover request message may instruct the T-RAN to send a handover request acknowledgment message/handover command message via the T-UPF to the user plane of the S-RAN via in-band signalling.

As shown in step 8, on receipt of the handover request message at the T-RAN, the T-RAN may perform one or more of evaluating the RAN transparent container, retrieving S-RAN IP address and/or TEID, allocating radio resources, allocating the T-RAN downlink IP address and/or TEID and retrieving the IP address and/or TEID where the T-UPF expects to receive the in-band signalling. Furthermore, the T-RAN provides a handover request acknowledge message to the T-UPF.

At step 9, the T-UPF provides the handover request acknowledge message to the user plane of the S-RAN. This is because the T-UPF has been instructed to do so by the T-AMF in step 5.

Therefore, steps 8 and 9 show the T-RAN providing the handover request acknowledge message to the user plane of the S-RAN via the T-UPF via in-band signalling. This may include the S-RAN IP address and/or TEID, and possibly the T-RAN IP address and/or TEID and the RAN transparent container. Alternatively or additionally the message may be a handover command message.

As shown in step 10, on receipt of the handover request acknowledge message or handover command message at the S-RAN via in-band signalling, the S-RAN provides a handover command message to a UE. The S-RAN may start indirect data forwarding to the T-UPF.

Once the UE is attached to the T-RAN, the T-RAN may send a notify message to the T-AMF by which the T-UPF is informed about the successful handover and that the T-UPF can start to send downlink packets to the T-RAN.

The T-AMF may provide a modify bearer request for downlink message to the T-UPF. On receipt of the modify bearer message at the T-UPF, the T-UPF may send downlink traffic to the T-RAN.

In some examples, instead of instructing the T-UPF via out-band signalling, the T-RAN may signal the handover completion information also via in-band signalling to the T-UPF. In some embodiments, this may further decrease the overall duration of the handover procedure.

In some examples, the TEID of the expected location defines a tunnel between user plane entities. Therefore the interface between the AMF and the SMF may need to be updated with the TEID'S of the user plane tunnels, otherwise the remote user plane tunnel may not know about its peer.

The procedure as shown in FIG. 11 may also be applicable if the S-RAN and/or the T-RAN were split into a user plane and a control plane. This is now described in more detail.

In some embodiments, one or more of the following signalling changes to FIG. 11 may occur if the S-RAN was split into an S-RAN-C and an S-RAN-U.

Before sending the handover required message to the S-AMF the S-RAN-C may instruct the S-RAN-U to expect and accept the handover request acknowledge message or handover request message in-band in the user plane being sent by the T-UPF at a later stage of the procedure.

The E1 interface may be such that the whole handover request acknowledge message or whole handover request message or parts may be reported to the S-RAN-C. On response, the S-RAN-C may provide the handover request message at the UE and the handover continues.

In some examples, the following signalling changes to FIG. 11 may occur if the T-RAN was split into a T-RAN-C and a T-RAN-U.

On receipt of the handover request message at the T-RAN-C with the indication that the procedure of a minimized preparation phase is supported by the remote side, and indirect data is to be applied, the T-RAN-C builds the parameter(s) for the handover request acknowledge message. In contrast to current procedures where a control plane message is sent to the AMF, the T-RAN-C sends this message to the T-RAN-U and instructs the T-RAN-U to send an in-band handover request acknowledge or handover command message via the user plane towards via the T-UPF/T-SGW-U to the S-RAN-U.

In some embodiments, the E1 interface may be augmented such that the handover request acknowledge message or handover request message is sent from the T-RAN-C to the T-RAN-U for transmission to the S-RAN-U via the T-UPF.

The AMF may know that if there is support for the procedure of minimizing the preparation phase and for indirect data forwarding, then there will be no handover request messages being sent from the T-RAN to the T-AMF anymore. Therefore, in this case, the T-AMF may only be able to supervise the successful receipt of a handover notify message being sent from the T-RAN to the AMF, which indicates that handover had been performed successfully. However, if the handover notify message is missing/not received then error handling may still be applied by the AMF.

This may also be applied in the context of 4G networks.

By applying this procedure to handover procedure there may be a reduction in the duration of the preparation phase for handovers. The handover preparation phase may be reduced as the control signalling travels with the payload packets which may be the shortest path to travel, as required by services such as for example ultra-reliable low latency (URLLC).

As an example, the following calculations may show how the procedure as shown in FIG. 11 may reduce the preparation phase for a handover, as compared to the legacy procedure.

As an example only, the handover request acknowledge message/handover command message from the target to the source RAN via the T-UPF takes a maximum say of 2*2 ms. The interaction between the T-AMF and the T-UPF takes say a minimum 2*18 ms. The interaction between the T-AMF and the T-RAN takes say a minimum 20 ms. The T-AMF and T-UPF interaction may take place via the T-SMF. In some examples, the T-AMF and the T-SMF are co-located in the same apparatus, and in other examples they may not be co-located. In legacy 3GPP architecture the AMF and the SMF are separate network functions, however, these network functions may be co-located in some examples. In some examples, any of the network functions may be co-located to form a combined network function.

The values used for these calculation are meant as an example only, to compare between the previous procedure and the procedure of some embodiments such as shown in FIG. 11 and FIGS. 14a to 14c (described later).

Figure 13:
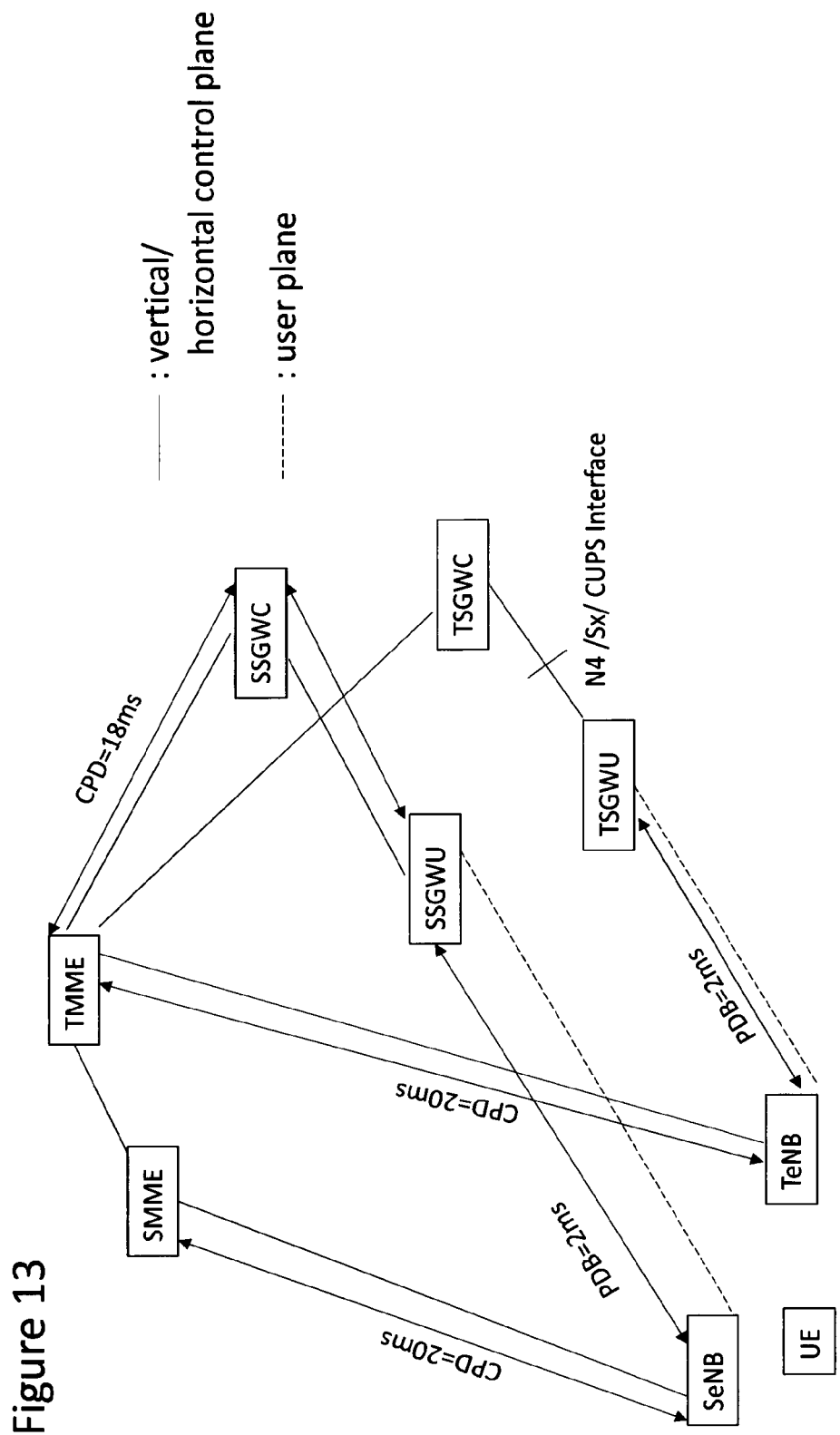
FIG. 13 schematically shows signalling delays.

In this regard, reference is made to FIG. 13 which shows various LTE entities: user device UE, source base station S-eNB, target base station T-eNB, source MME SMME, target MME, source SGW control plane SSGWC, target SGW control plane TSGWC, source SGW user plane SSGWU and target SGW user plane TSGWU. The packet delay budget (PDB) is a maximum of 2 ms between: the S-eNB and the SSGWU; and the T-eNB and the T-SGW-U. The control plane delay (CPD) between the S-eNB and the SMME is around 20 ms as is that delay between the T-eNB and the TMME. The CPD between the TMME and the SSGWC is 18 ms. The specific delays are example delays and different systems might have different delays The starting point for the calculation may be step 5 of FIG. 11, at the receipt of the message at the T-AMF:

Previously proposed procedure:

Number message exchanged:

| From T-AMF to UPF: 2 | delay: 2*18 ms |
|---|---|
| From UPF to T-AMF: 2 | delay: 2*18 ms |
| From T-AMF to T-RAN: 1 | delay: 1*20 ms |
| From T-RAN to T-AMF: 1 | delay: 1*20 ms |
| From T-AMF to S-AMF: 1 | delay: negligible (if the T-AMF and S-AMF are co-located) |
| From T-AMF to S-RAN: 1 | delay: 1*20 ms |

This results in 8 messages.
This results in 132 ms delay.
Some embodiments using the procedure as set out in FIG. 11:
Number message exchanged:
Control plane:

| From TMME to SGW: 1 | delay: 18 ms |
|---|---|
| From SGW to TMME: 1 | delay: 18 ms |
| From TMME to TeNB: 1 | delay: 20 ms |

This results in 3 control plane messages.
User plane:

| From target eNB to target SGW-U: 1 | delay 2 ms |
|---|---|
| From target SGW-U to source eNB: 1 | delay 2 ms |

This results in 2 user plane messages.
This leads to 5 messages overall. This results in 60 ms delay.

In this example, using the procedure of FIG. 11 the preparation phase of handover is decreased by 54.5 percent as compared to previous procedures. The number of messages may be reduced by 37.5 percent.

Reference is made to FIGS. 14a to 14c which show various LTE entities: user device UE, source base station S-eNB, target base station T-eNB, source MME (S-MME), target MME, source SGW control plane (S-SGW-C), target SGW control plane (T-SGW-C), source SGW user plane (S-SGW-U) and target SGW user plane (T-SGW-U). These Figures shows messaging flow between the entities. FIGS. 14a and 14b show the handover preparation with indirect data forwarding and FIG. 14c show handover execution with indirect data forwarding.

Reference is made to FIG. 14a. A message is sent from the SeNB to the SMME. This message may provide an indication that handover is required. The eNB container comprises an IP address/TEID for in-band handover (HO) acknowledgment/non-acknowledgement (ACK/NO) command.

A message is sent from the S-MME to the T-MME which is a forward relocation request. (This may include a forwarding indication and an eNB container including a new IP address/TEID.)

In some embodiments a combined create session request and a create indirect forward message is sent from the T-MME to the T-SGWC. (This may include a request UL, request indirect T-SGW-U target Address/TEID).

This message is sent form the T-SGWC to the T-SGW-U.

Reference is now made to FIG. 14b which shows the next stage in the signalling.

A message is sent from the T-SGW-U to the T-SGW-C which is a combined create session/indirect forward response. (Optionally this response includes UL User data, optionally this response includes an indirect TSGWU target Address/TEID, and optionally this includes an IP address/TEID for in-band HO ACK/NO command).

A message is sent from the T-SGW-C to the T-MME which is a combined create session/indirect response. (This includes UL User data, an indirect T-SGW-U target Address/TEID, and a new SGW-U IP address/TEID).

A message is sent from the TMME to the T-eNB. This may be a handover request (this has an eNB container, UL user data, indirect T-SGW-U target address/TEID, and the new SGW-U IP address/TEID).

A message is sent from the T-eNB user plane to the T-SGW-U. This may be a handover request Ack/handover command. (This has a source eNB address/TEID, TSGWU target Address/TEID, target eNB address/TEID).

A message is sent from the T-SGW-U to the S-eNB. This may be a handover request Ack/handover command. (This may have a T-SGW-U target address/TEID).

Reference is made to FIG. 14c which shows execution of handover with indirect data forwarding.

Then there is indirect data forwarding form the S-eNB to the T-SGW-U and from the T-SGW-U to the T-eNB.

A handover notify message is sent from the T-eNB to the T-MME. The TMME sends a modify bearer request for downlink to the T-SGW-C. This request is sent from the T-SGW-C to the T-SGW-U.

Thus for embodiments deployed in a 4G system the combined create session request and create indirect forwarding indication message maybe provided by an S-MME to an T-SGW-C. The T-SGW-C may then forward the combined message to a T-SGW-U and may indicate that later on, an in-band message being sent from a target base station to the T-SGW-U is to be expected and should be forwarded to a source base station. If the SGW-U is not able to allocate the TEID and IP Address of the T-SGW-U, then the T-SGW-C may perform this task instead.

On receipt of the combined create session request message and create indirect forward message, the SGW-U acknowledges the message and responds with the uplink address of the target SGW-U, the IP address and TEID for the indirect T-SGW-U, to the SGW-C. The SGW-U may add its own IP Address and/or TEID into the acknowledgment message. This may be for embodiments where the SGW-U expects to receive a handover request acknowledgement message or a handover command message from a target base station.

On receipt of the combined message at the T-MME, the T-MME provides a handover request message with the transparent container, the uplink user data and the indirect T-SGW-U target IP Address and/or TEID, to the target base station. The handover request message may instruct the target base station to send a handover request acknowledgment message/handover command message via the T-SGW-U to the user plane of the source base station via in-band signalling.

In some embodiments, the total cost of ownership (TCO) may be positively impacted as the overall number of transactions may be reduced. Therefore, this may improve the user experience compared to previously proposed procedures.

In some embodiments, it is possible to have two incompatible slices such as URLLC and enhanced mobile broadband (eMBB) running in a 5G network while simultaneously providing a best user experience, for example, for example real time gaming.

It is noted that the CUPS interface may also be impacted as an SGW-C instructs an SGW-U to accept a handover request acknowledge message or handover command message in the user plane and to forward this to an S-eNB. The allocation of the in-band connection interface point, for example, IP address and/or TEID may be allocated by the user plane or by the control plane of the SGW.

It is noted that FIG. 11 may not show all of the necessary steps required for a handover. Some of the signalling between network functions has been omitted for clarity. The use of the RAN and AMF are simply 5G examples and the MME is a 4G example. Other functions from other 3GPP developments or non-3GPP developments may be suitable for this procedure.

Furthermore, E1 is used simply as an example. The E1 interface is the interface for the 5G RAN between the control plane and the user plane. N4 and/or an Sx interface may also be suitable in some embodiments.

In embodiments, if there is a time difference in the delay between the control plane (CP) and the user plane (UP) delay during a handover then in order to make sure that the sequence number (SN) information is not received later at the target base station/RAN user plane it is proposed that the source base station/RAN user plane sends in-band SN information (directly or indirectly) to the user plane of the target eNB/RAN instead of signalling it on the control plane via the source MME/AMF and target MME/AMF to the target eNB/RAN. This procedure will be discussed in more detail below with the use of FIG. 12.

Figure 12:
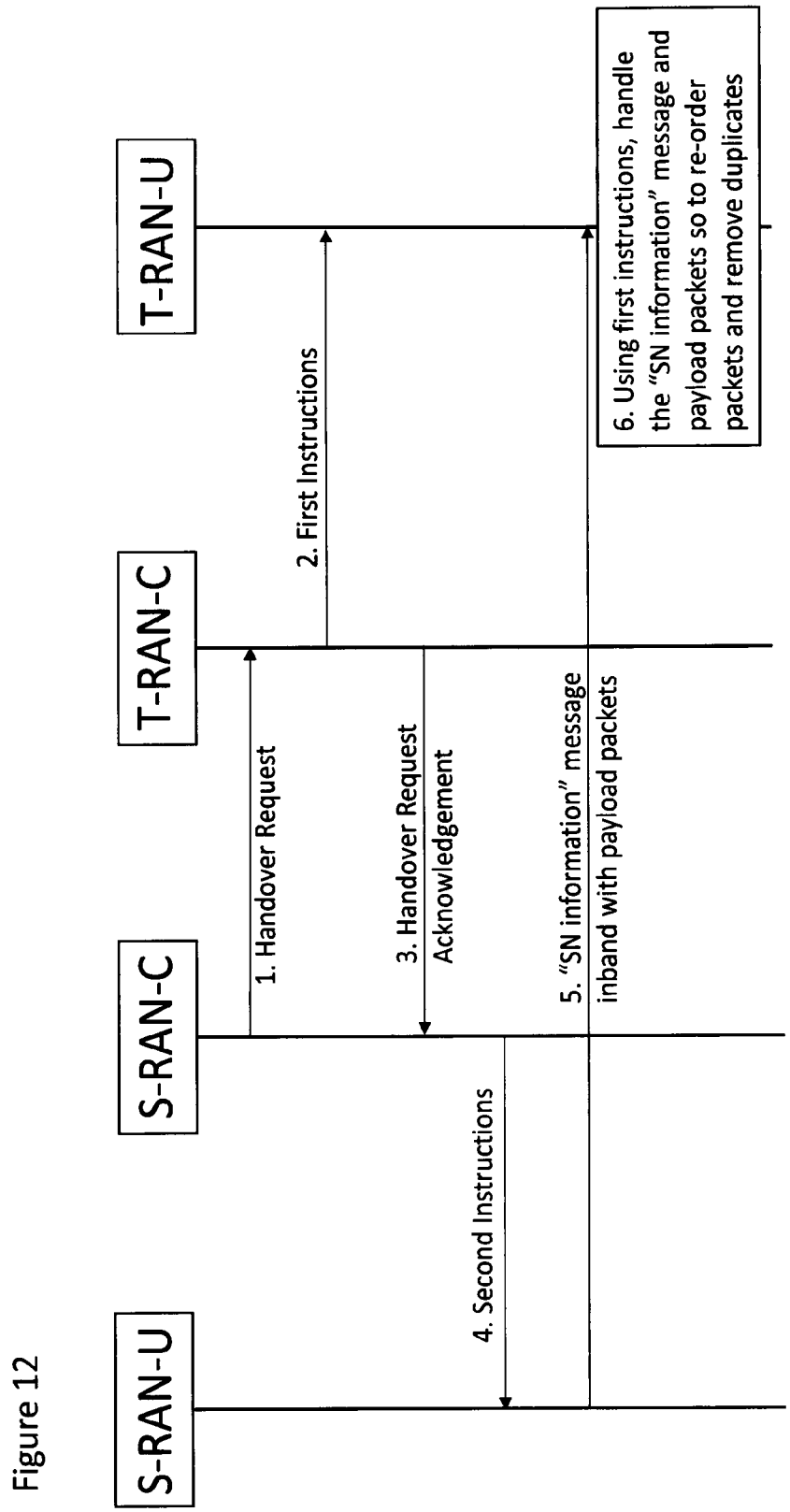
FIG. 12 shows an example signalling diagram between network functions.

FIG. 12 shows an example signalling diagram between network functions during a preparation and execution phase for an optimized handover (for example Xn/X2).

At step 1 the source RAN control plane (S-RAN-C) provides a handover request to the target RAN control plane (T-RAN-C). In FIG. 12 the handover request is provided directly to the T-RAN-C, however, in other examples the handover request is provided via an AMF. If the handover request is provided directly from the S-RAN-C to the T-RAN-C then the handover request will also comprise an indication that the S-RAN-C supports direct communication between the S-RAN-C and the T-RAN-C.

As shown in step 2, on receipt of the handover request message at the T-RAN-C the T-RAN-C provides first instructions. The first instructions are such that the T-RAN-C instructs the user plane of the target RAN (T-RAN-U) to expect to later receive and check for and recognize the receipt of an SN information message in-band in the user plane, retrieve the information from the SN information message and act as if the SN information has been sent via an E1 interface from the control plane to the user plane. The in-band SN information message may be received by the T-RAN-U at a later time in the procedure. Step 2 can only take place if the S-RAN-C and the T-RAN-C support the procedure of an optimized handover.

As shown in step 3, the T-RAN-C responds to the S-RAN-C with a corresponding handover request acknowledgement message. In this example, the handover request acknowledgement message is provided directly to the S-RAN-C, however, in other examples the handover request acknowledgement message is provided via the AMF. In this example the handover request acknowledgement is provided via the control plane to the S-RAN, however, in other examples the handover request acknowledgement can be provided via the user plane to the S-RAN. The handover request acknowledgement message may carry an endpoint ID (e.g. fully qualified tunnel endpoint identifier (TEID)) for the user plane tunnel, which may use for example, general packet radio services tunneling protocol (GTP) or generic routing encapsulation (GRE). In this example, the handover request acknowledgement is provided in the control plane, but in other examples it can be provided through the user plane.

As shown in step 4, on receipt of the handover request acknowledge message at the S-RAN-C, the S-RAN-C provides second instructions to the user plane of the source RAN (S-RAN-U). The second instructions are such that the S-RAN-C instructs the S-RAN-U to send an SN (sequence number) information message in-band along with payload packets in the user plane towards the T-RAN-U directly. This contrasts with typical systems whereby the SN information message is provided on the control plane to the T-RAN-C or via the S-AMF and T-AMF to the control plane of the T-RAN-U.

At step 5, as instructed by the S-RAN-C, the S-RAN-U provides an SN information message along with payload packets to the T-RAN-U. This bypasses the AMF and other control plane network functions, and thus bypassing the control plane.

As shown in step 6, on receipt of the SN information message in-band with payload packets at the T-RAN-U and as instructed by the S-RAN-C with the first instructions, the T-RAN-U handles both the SN information and the payload packets to, for example, reorder the packets and/or to remove duplicated packets. The reordering of the packets and the removal of duplicated packets may be done by considering the count value in uplink and downlink direction. Details of the count value in uplink and downlink are found in 3GPP TS 36.300 chapter 10.1.2.1.2. This may be used in some embodiments.

With the signalling procedure as shown in FIG. 12, the SN information may not arrive later than the user plane packets at the T-RAN-U without needing to delay the sending of the user plane packets at the S-RAN. The SN information may be copied/repeated information, indicating the frame of when switching at the source base station is performed earlier in the handover procedure. Furthermore, as the SN information is sent in-band with the payload packets, the handover execution phase may be significantly reduced.

Therefore, the buffering time may be reduced to a minimum and the T-RAN-U will be able to act on the packets received at the user plane, for example, recognizing duplicates and ensuring in-sequence delivering by considering the count value in uplink and down link direction. This may minimize the dimension of the buffer at the T-RAN-U and may minimize packet loss.

In the example signalling shown in FIG. 12, 5G network functions such as S-RAN and T-RAN are used to explain the example. However, the procedure is also applicable to 4G systems and even non-3GPP fixed access networks. For example, the S-RAN-U could be replaced with an S-eNB-U for a 4G system.

Figure 6:
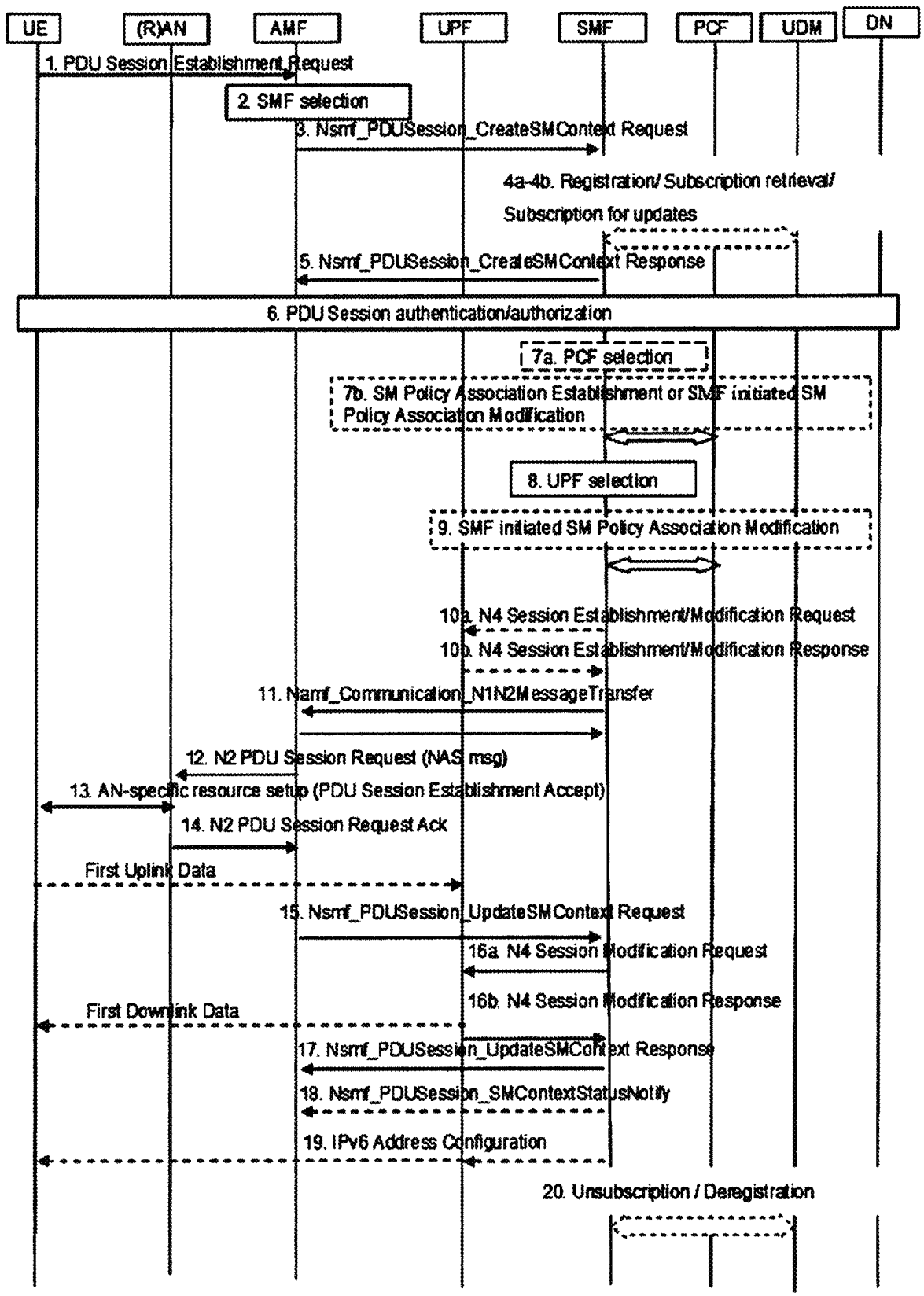
FIG. 6 shows an example signalling diagram for a protocol data unit session establishment.

FIG. 6 shows an example signalling diagram for a protocol data unit (PDU) session establishment. FIG. 6 is the signalling diagram presented as Figure 4.3.2.2.1-1 of 3GPP TS 23.502.

At step 1, a UE provides a PDU establishment request to an AMF.

At step 2, the AMF performs SMF selection.

At step 3, the AMF provides an Nsmf_PDUSession_CreateSMContext request to an SMF.

In steps 4a-4b the SMF performs registration/subscription retrieval/subscription for updates with a UDM.

In step 5, the SMF provides an Nsmf_PDUSession_CreateSMContext response message to the AMF.

At step 6, there is an optional secondary authorization/authentication. If the Request Type in step 3 indicates Existing PDU Session, the SMF does not perform secondary authorization/authentication. If the Request Type received in step 3 indicates Emergency Request or Existing Emergency PDU Session, the SMF shall not perform secondary authorization/authentication. If the SMF needs to perform secondary authorization/authentication during the establishment of the PDU Session by a designated name-authentication, authorization, and accounting server (DN-AAA), the SMF triggers the PDU Session establishment authentication/authorization.

At step 7a, the SMF performs PCF selection.

At step 7b the SMF performs SM policy association establishment or SMF initiated SM policy association modification.

At step 8, the SMF performs UPF selection.

At step 9, the SMF performs SMF initiated SM policy association modification.

At step 10a, the SMF provides an N4 session establishment/modification request to the UPF.

At step 10b, the UPF provides an N4 session establishment/modification response to the SMF.

At step 11, the SMF provides a Namf_Communication_N1N2MessageTransfer with the AMF.

At step 12, the AMF provides an N2 PDU session request message to a RAN.

At step 13, the UE and the RAN exchange AN-specific resource setup information.

At step 14, the RAN provides an N2 PDU session request acknowledgement to the AMF.

At step 15, the AMF provides an Nsmf_PDUSession_UpdateSMContext request to the SMF.

Between steps 14 and 15 is the first uplink data transmission from the UE to the UPF.

At step 16a, the SMF provides an N4 session modification request to the UPF.

At step 16b, the UPF provides an N4 session modification response to the SMF.

Between steps 16a and 16b is the first downlink data transmission from the UPF to the UE.

At step 17, the SMF provides an Nsmf_PDUSession_UpdateSMContext response to the AMF.

At step 18, the SMF provides an Nsmf_PDUSession_SMContextStatusNotify message to the AMF.

At step 19, the SMF provides to the UPF which in turns provides to the UE, IPv6 Address Configuration information.

At step 20, the SMF and UDM perform unsubscription/deregistration.

Figure 7:
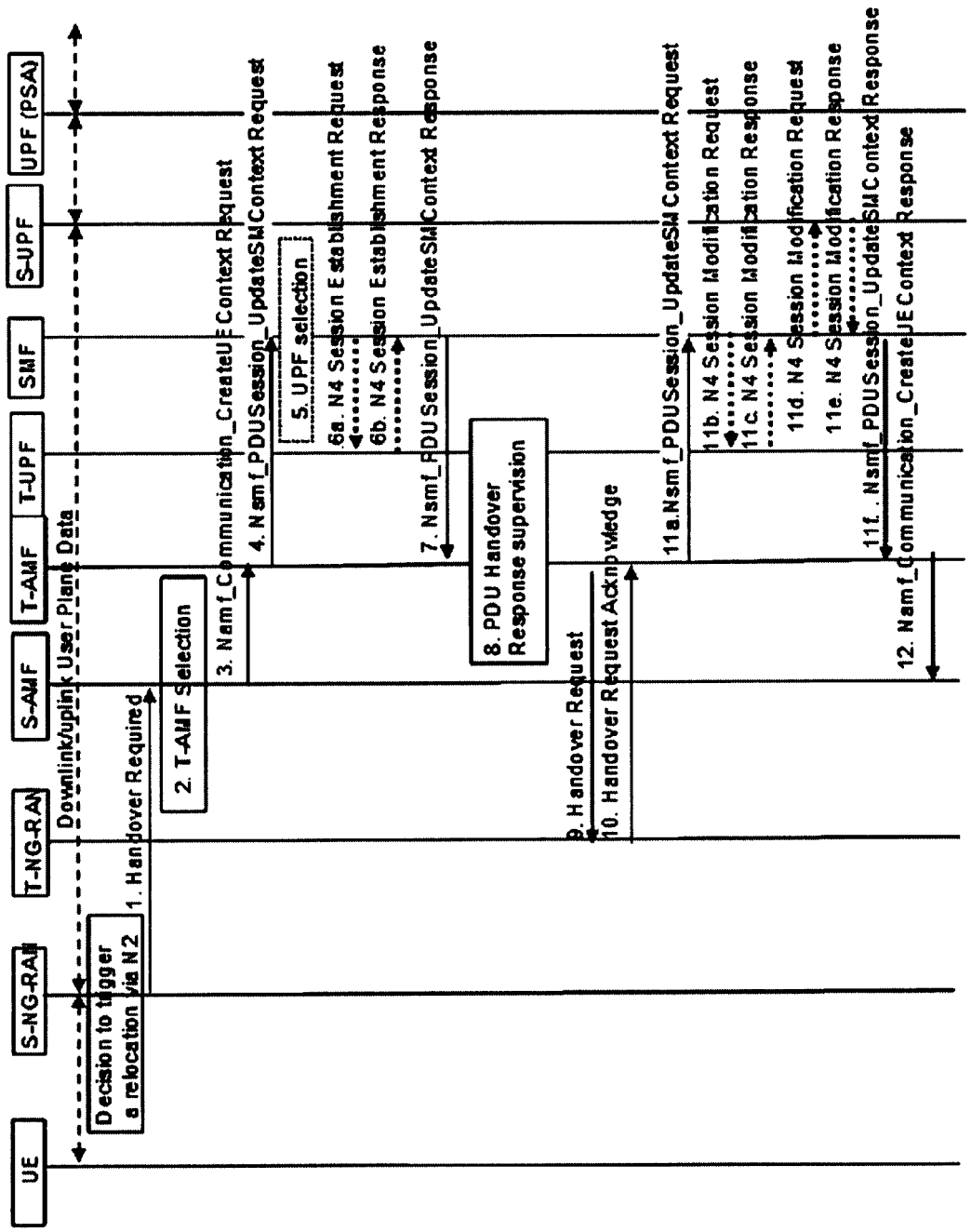
FIG. 7 shows an example signalling diagram for inter new generation (NG) or 5G radio access network RAN node based handover in the preparation phase.

FIG. 7 shows an example signalling diagram for inter NG-RAN node N2 based handover in the preparation phase. FIG. 7 shows the signalling of Figure 4.9.1.3.2-1 of 3GPP TS 23.502.

A decision to trigger a relocation via N2 will lead to step 1, whereby a source RAN (S-RAN) will provide a handover required message to a source AMF (S-AMF).

The message exchange (e.g. step 1) of FIG. 10 may use or replace the messages of step 1 of FIG. 7.

The message exchange (e.g. step 1) of FIG. 11 may use or replace the messages of step 1 of FIG. 7.

At step 2, the S-AMF will perform target AMF (T-AMF) selection.

At step 3, the S-AMF will provide a Namf_communication_CreateUEContext request message to the T-AMF.

The message exchange (e.g. step 3) of FIG. 10 may use or replace the messages of step 3 of FIG. 7.

The message exchange (e.g. step 3) of FIG. 11 may use or replace the messages of step 3 of FIG. 7.

At step 4, the T-AMF will provide an Nsmf_PDUSession_UpdateSMContext request message to an SMF.

At step 5, the SMF will perform UPF selection.

At step 6a, the SMF will provide an N4 session establishment request to a target UPF (T-UPF).

At step 6b, the T-UPF will provide a N4 session establishment response to the SMF.

At step 7, the SMF will provide an N smf_PDUSession_UpdateSMContext response to the T-AMF.

At step 8, the T-AMF performs PDU handover response supervision.

At step 9, the T-AMF provides a handover request message to a target RAN (T-RAN).

The message exchange (e.g. step 4) of FIG. 10 may use or replace the messages of step 9 of FIG. 7.

The message exchange (e.g. step 7) of FIG. 11 may use or replace the messages of step 9 of FIG. 7.

The message exchange (e.g. step 1) of FIG. 12 may replace the messages of steps 1, 3 and 9 of FIG. 7, such that the handover required/request message is provided directly from the S-RAN-C to the T-RAN-C rather than via the core network as in FIG. 7. Step 1 of FIG. 12 suggests to additionally send the count value in-band via the user plane from S-RAN-U to the T-RAN-U.

At step 10, the T-RAN provides a handover request acknowledgment message to the T-AMF.

At step 11a, the T-AMF provides an N smf_PDUSession_UpdateSMContext request message to the SMF.

At step 11 b, the SMF will provide an N4 Session modification request to the T-UPF.

At step 11c, the T-UPF will provide a N4 session modification response to the SMF.

At step 11d, the SMF will provide an N4 session modification request to a source UPF (S-UPF).

At step 11e, the S-UPF will provide a N4 session modification response to the SMF.

At step 11f, the SMF will provide an N smf_PDUSession_UpdateSMContext response message to the T-AMF.

The message exchange (e.g. steps 5 and 6) of FIG. 11 may use or replace the messages of steps 4 to 7 combined with the messages of steps 11a to 11f of FIG. 7.

At step 12, the T-AMF will provide a Namf_communication_CreateUEContext response message to the S-AMF.

The message exchange (e.g. step 5) of FIG. 10 may replace the messages of steps 10 to 12 of FIG. 7 and step 1 of FIG. 8 as shown below.

The message exchange (e.g. steps 8 and 9) of FIG. 11 may replace the messages of steps 10 to 12 of FIG. 7 and step 1 of FIG. 8 as shown below. The replacing of the messages will described in more detail below.

The message exchange (e.g. step 3) of FIG. 12 may replace the messages of steps 10 to 12 of FIG. 7 and step 1 of FIG. 8 as shown below. The replacing of the messages will described in more detail below.

Figure 8:
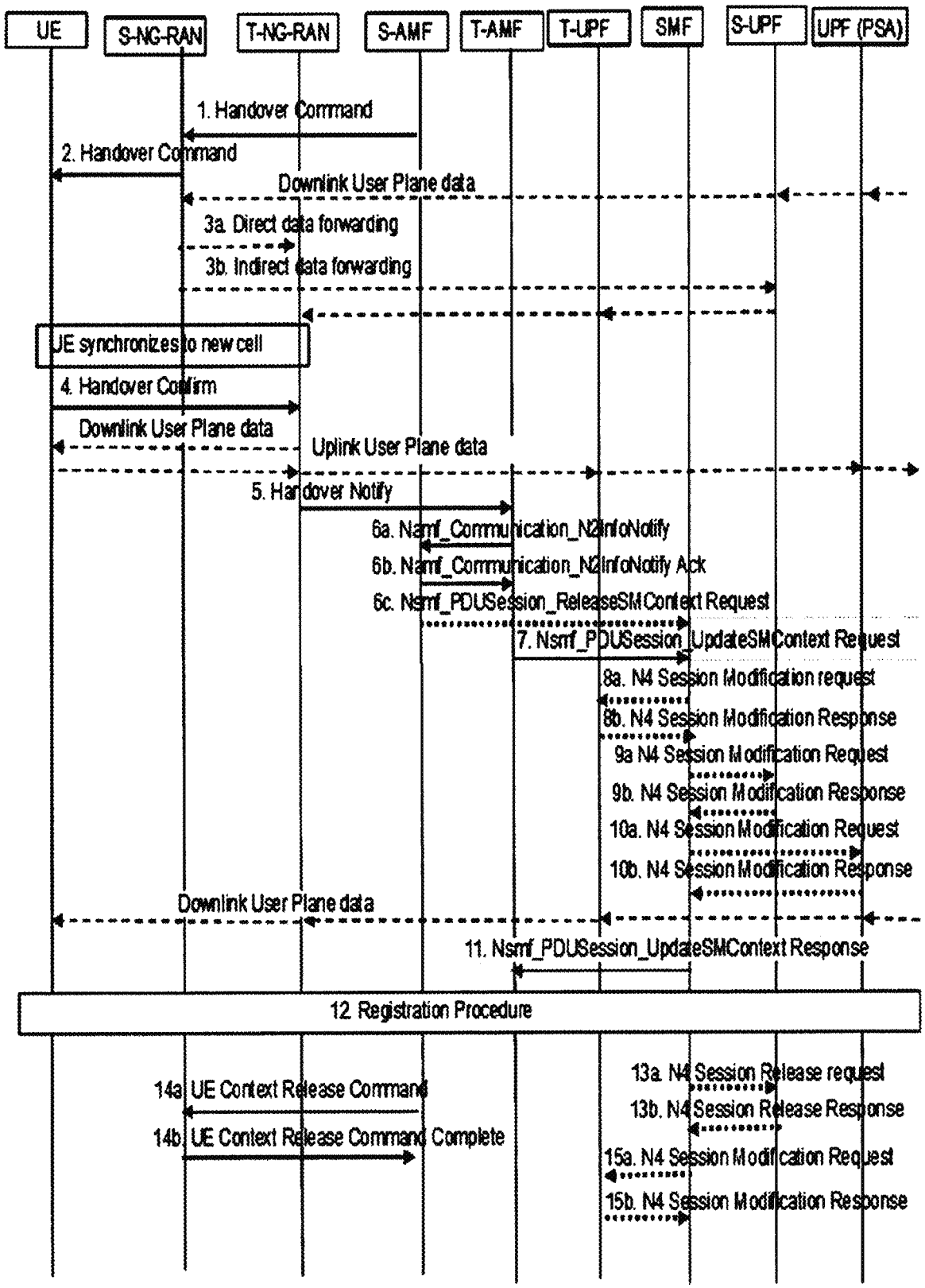
FIG. 8 shows an example signalling diagram for the inter new generation (NG) or 5G radio access network RAN node based handover in the execution phase.

FIG. 8 shows an example signalling diagram for Inter NG-RAN node N2 based handover in the execution phase. FIG. 8 follows on from the signalling shown in FIG. 7. The signalling shown in FIG. 8 is that of Figure 4.9.1.3.3-1 of 3GPP TS 23.502.

In FIG. 8, at step 1, the S-AMF provides a handover command message to the S-RAN.

The providing of the handover request acknowledgment message to the S-RAN in step S3 of FIG. 12 may also replace the message of step 1 of FIG. 8.

The message exchange (e.g. step 5) of FIG. 10 may also use or replace the messages of step 1 of FIG. 8.

As described above, the message exchange (e.g. steps 8 and 9) of FIG. 11 may also replace the message of step 1 of FIG. 8, in addition to replacing steps 10 to 12 of FIG. 7. In FIG. 7 steps 10 to 12 with FIG. 8 step 1, the handover request acknowledgment is provided from the T-RAN to the T-AMF which triggers a message exchange between the T-AMF, the T-UPF and the SMF. Finally the S-AMF provides a handover command message to the S-RAN. However, with the optimized handover, as shown in steps 8 and 9 of FIG. 11, as earlier instructed, the T-RAN sends an in-band user plane message to the T-UPF and the T-UPF sends the in-band message to the S-RAN user plane. Thus reducing the amount of signalling required.

As described above, the message exchange (e.g. step 3) of FIG. 12 may also replace the message of step 1 of FIG. 8, in addition to replacing steps 10 to 12 of FIG. 7. In the optimized handover of FIG. 12, the handover request acknowledgment is provided from the T-RAN-C to the S-RAN-C rather that via the core network as in steps 10 to 12 of FIG. 7. Thus, the signalling as shown in FIG. 12 may reduce signalling compared to the legacy procedure.

Continuing with the explanation of FIG. 8, at step 2, the S-RAN provides a handover command message to the UE.

The message exchange (e.g. step 6) of FIG. 10 may also use the messages of step 2 of FIG. 8.

The message exchange (e.g. step 10) of FIG. 11 may also use the messages of step 2 of FIG. 8.

In step 3, uplink packets are sent from the T-RAN to the T-UPF and UPF PDU session anchor (PSA). Downlink packets are sent from the UPF (PSA) to the S-RAN via the S-UPF. The S-RAN should start the forwarding of downlink data from the S-RAN towards the T-RAN for quality of service (QoS) Flows subject to data forwarding. This may be either direct (step 3a) or indirect forwarding (step 3b). At this point the UE synchronises to the new cell (i.e. UE syncs to T-RAN).

The message exchange (e.g. step 5) of FIG. 12 may use or replace the messages of steps 3a and 3b of FIG. 8, but instead provide the status transfer directly from the user plane of the S-RAN to the user plane of the T-RAN.

At step 4, the UE provides a handover confirm message to the T-RAN. The handover confirm message will indicate that the handover has been successful.

At step 5, the T-RAN provides a handover notify message to the T-AMF.

At step 6a, the T-AMF provides an Namf_Communication_N2InfoNotify message to the S-AMF.

At step 6b, the S-AMF provides an Namf_Communication_N2InfoNotify acknowledgment message to the T-AMF.

At step 6c, the S-AMF provides an Nsmf_PDUSession_ReleaseSMContext request message to the SMF.

At step 7, the T-AMF provides an Nsmf_PDUSession_UpdateSMContext request message to the SMF.

At step 8a, the SMF provides an N4 session modification request message to the T-UPF.

At step 8b, the T-UPF provides an N4 session modification response message to the SMF.

At step 9a, the SMF provides an N4 session modification request message to the S-UPF.

At step 9b, the S-UPF provides a N4 session modification response message to the SMF.

At step 10a, the SMF provides an N4 session modification request message to the UPF (PSA).

At step 10b, the UPF (PSA) provides a N4 session modification response message to the SMF.

At step 11, the SMF provides an Nsmf_PDUSession_UpdateSMContext response message to the T-AMF.

At step 12, the UE initiates a mobility registration update procedure.

At step 13a, the SMF provides a N4 session release request message to the S-UPF.

At step 13b, the S-UPF provides an N4 session release response message to the SMF.

At step 14a, the S-AMF provides a UE context release command message to the S-RAN.

At step 14b, the S-RAN provides a UE context release command complete message to the S-AMF.

At step 15a, the SMF provides an N4 session modification request message to the T-UPF.

At step 15b, the T-UPF provides an N4 session modification response message to the SMF.

Figure 9:
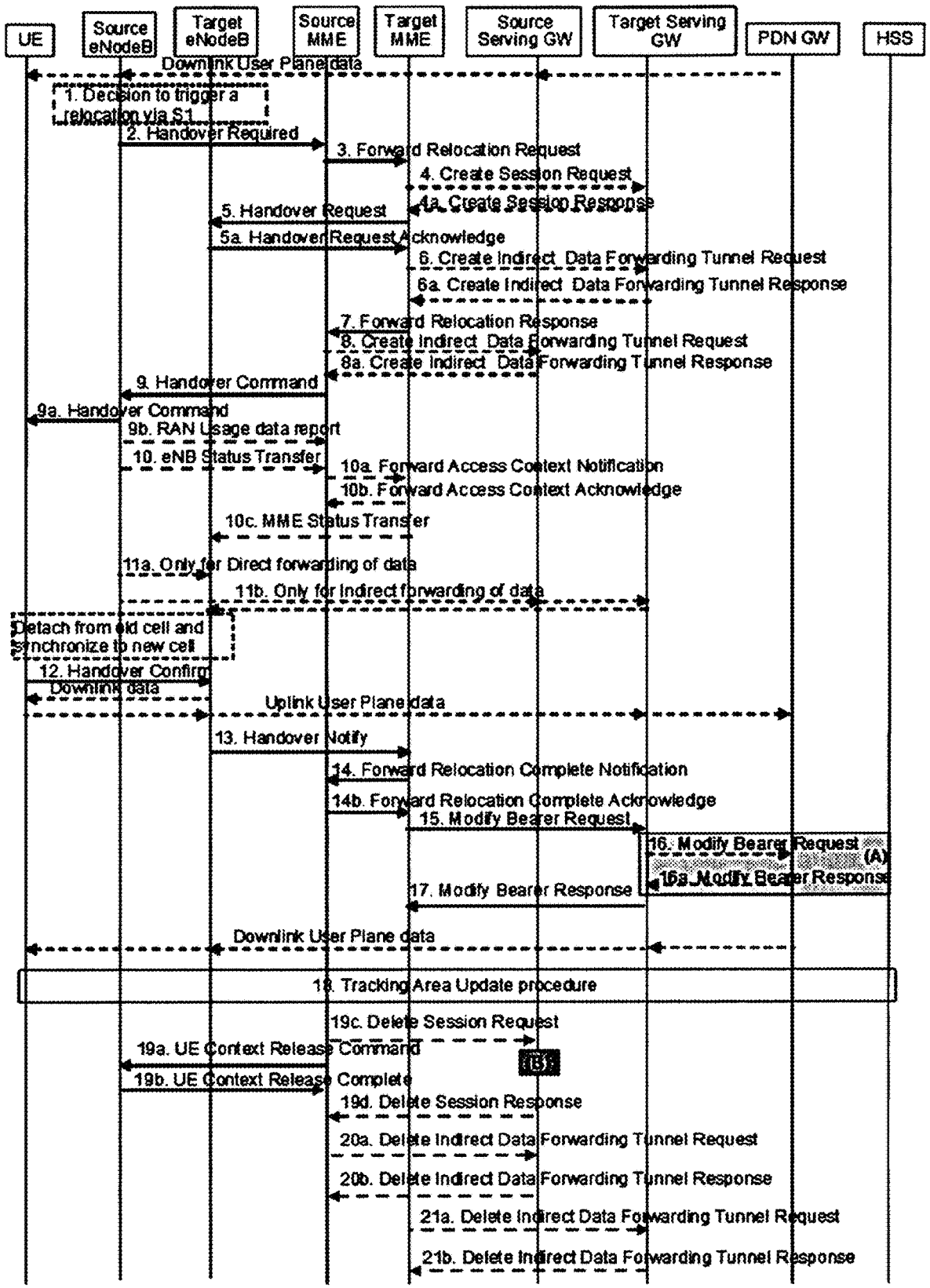
FIG. 9 shows an example signalling diagram for an S1-based handover.

FIG. 9 shows an example signalling diagram for an S1-based handover. The signalling shown in FIG. 9 is that of Figure 5.5.1.2.2-1 of 3GPP TS 23.401.

At step 1, a source eNB (S-eNB) decides to trigger a relocation via an S1 handover.

The message exchange (e.g. step 1) of FIG. 10 may use or replace the messages of step 2 of FIG. 9.

The message exchange (e.g. step 1) of FIG. 11 may use or replace the messages of step 2 of FIG. 9.

At step 2, the S-eNB provides a handover required message to a source MME (S-MME).

At step 3, the S-MME provides a forward relocation request to a target MME (T-MME).

The message exchange (e.g. step 3) of FIG. 10 may use or replace the messages of step 3 of FIG. 9.

The message exchange (e.g. step 3) of FIG. 11 may use or replace the messages of step 3 of FIG. 9.

At step 4, the T-MME provides a create session request to a target SGW (T-SGW).

At step 4a, the T-SGW provides a create session response to the T-MME.

At step 5, the T-MME provides a handover request message to a target eNB (T-eNB).

The message exchange (e.g. step 4) of FIG. 10 may use or replace the messages of step 5 of FIG. 9.

The message exchange (e.g. step 7) of FIG. 11 may use or replace the messages of step 5 of FIG. 9.

The message exchange (e.g. step 1) of FIG. 12 may replace the messages of steps 2 to 5 of FIG. 9. Step 1 of FIG. 12 directly provides the handover request from the S-RAN-C to the T-RAN-C rather than providing the handover request via the S-MME/T-MME as in steps 2 to 5 of FIG. 9.

At step 5a, the T-eNB provides a handover request acknowledgement to the T-MME.

At step 6, the T-MME provides a create indirect data forwarding tunnel request to the T-SGW.

At step 6a, the T-SGW provides a create indirect data forwarding tunnel response to the T-MME.

The message exchange (e.g. steps 5 and 6) of FIG. 11 may use or replace the messages of steps 4 and 4a of FIG. 9, but also simultaneously the steps 6 and 6a of FIG. 9. In FIG. 11, the T-AMF may also require the tunnel ID for the in-band user plane message to be sent later on.

At step 7, the T-MME provides a forward relocation response message to the S-MME.

At step 8, the S-MME provides a create indirect data forwarding tunnel request to a source SGW (S-SGW).

At step 8a, the S-SGW provides create indirect data forwarding tunnel response to the S-MME.

At step 9, the S-MME provides a handover command message to the S-eNB.

The message exchange (e.g. step 5) of FIG. 10 may replace the messages of steps 5a to 9 of FIG. 9, but instead the handover request acknowledgement message is provided directly from the T-eNB to the S-eNB rather than via the core network as in FIG. 9.

The message exchange (e.g. steps 8 and 9) of FIG. 11 may replace the messages of steps 5a to 9 of FIG. 9, but instead the handover request acknowledgement message is provided via the T-SGW from the T-eNB to the S-eNB rather than via the T-MME and S-SGW as in FIG. 9.

The message exchange (e.g. step 3) of FIG. 12 may replace the messages of steps 5a to 9 of FIG. 9.

In step 9a, the S-eNB provides the handover command message to the UE.

The message exchange (e.g. step 6) of FIG. 10 may use or replace the messages of step 9a FIG. 9.

The message exchange (e.g. step 10) of FIG. 11 may replace the messages of step 9a FIG. 9.

In step 9b, the S-eNB provides a RAN usage data report to the S-MME.

In step 10, the S-eNB provides an eNB status transfer message to the S-MME.

At step 10a, the S-MME provides a forward access context notification to the T-MME.

At step 10b, the T-MME provides a forward access context acknowledgment to the S-MME.

At step 10c, the T-MME provides an MME status transfer message to the T-eNB. Then the S-eNB starts the forwarding of downlink data from the S-eNB towards the T-eNB for bearers subject to data forwarding.

The message exchange (e.g. step 5) of FIG. 12 may replace the messages of steps 10a to 10c of FIG. 9, but instead provide the status transfer directly from the user plane of the S-eNB to the user plane of the T-eNB.

The forwarding is either direct from the S-eNB to the T-eNB as shown in step 11a, or the forwarding is indirect as shown in step 11b. Indirect forwarding is from the S-eNB to the S-SGW, then to the T-SGW, and finally to the T-eNB. At this point, the UE can detach from the S-eNB and synchronise to the T-eNB.

At step 12, the UE provides a handover confirm message to the T-eNB.

At step 13, the T-eNB provides a handover notify message to the T-MME.

At step 14, the T-MME provides a forward relocation complete notification to the S-MME.

At step 14a, the S-MME provides a forward relocation complete acknowledgement to the T-MME.

At step 15, the T-MME provides a modify bearer request to the T-SGW.

At step 16, the T-SGW provides a modify bearer request to a PDN GW.

At step 16a, the PDN GW provides a modify bearer response to the T-SGW.

At step 17, the T-SGW provides a modify bearer response to the T-MME.

At step 18, the UE initiates a Tracking Area Update procedure.

At step 19a, the S-MME provides a UE context release command to the S-eNB.

At step 19b, the S-eNB provides a UE context release complete message to the S-MME.

At step 19c, the S-MME provides a delete session request message to the S-SGW.

At step 19d, the S-SGW provides a delete session response message to the S-MME.

At step 20a, the S-MME provides a delete indirect data forwarding tunnel request to the S-SGW.

At step 20b, the S-SGW provides a delete indirect data forwarding tunnel response message to the S-MME.

At step 21a, the T-MME provides a delete indirect data forwarding tunnel request message to the T-SGW.

At step 21b, the T-SGW provides a delete indirect data forwarding tunnel response message to the T-MME.

In some examples, the network functions participating in procedures, such as that shown in FIG. 12, shall indicate in the signalling messages that they are capable and willing to participate in the new procedure. For example, the eNB/RAN and/or the MME/AMF shall signal and evaluate these indications to support the new procedure when performing the steps of, for example, FIG. 12. This is to be able to differentiate from network functions which cannot participate as they may be legacy version of the 4G/5G network. If all relevant network functions are capable, then the new procedure applies, if not, the legacy 3GPP procedure is performed. This will now be discussed in more detail.

Network slicing is a form of virtual network architecture. Network slicing allows a plurality of virtual networks to be instantiated on top of a shared physical infrastructure. The benefit is that the virtual networks can be customised to the needs of a customer or an operator. For example, in 5G systems, a single physical network may be sliced into multiple virtual networks that can support different radio access networks (RANs), or different service types running across a single RAN. Network slicing may be used to partition the core network and/or it may also be implemented inside the RAN.

For example, in 3GPP TS 23. 501/23.502 there is one single AMF for a UE attached to multiple slices simultaneously, if multiple slices are allowed in the public land mobile network (PLMN) area. However, that means that only slices which are compatible with each other can be served by one single AMF hosting those multiple and compatible slices. Thus, in situations whereby slices of a network are incompatible with one another, for example, ultra-reliable low latency (URLLC) with high latency (e.g. internet browsing), there cannot be a single AMF serving the plurality of slices.

For example, in 3GPP TS 23.502 there may be a supervision timer in the AMF which supervises the response to be received from an SMF which leads to termination of the handover (HO) at least for those protocol data unit (PDU) sessions which did not respond in time. The supervision timer may be governed by a lowest timer value of a maximum delay indication for the PDU sessions that are a candidate for HO. This means that if one high demanding slice expects a fast reaction time, other PDU session for other slices are not considered for HO.

This may mean that incompatible services cannot be served in two slices served by the same AMF. Therefore, these services would not be able to be run on two slices of the same physical network architecture.

In some embodiments, slices will declare if they are not compatible and do not support procedures such as set out previously. For example, an enhanced mobile broadband (eMBB) slice and URLLC slice are not compatible together and so they would declare that they are not compatible with one another in any suitable manner.

In some embodiments, if any of the participating network functions (NFs) including the RAN does not support the procedure of determining a time difference between the control plane and the user plane during handover and/or if the network already knows that the two slices are incompatible due to the specified behaviour (for example as set out in 3GPP TS 23.502 chapter 4.9.1.3.3) or because of any other relevant issue then the communication device is requested to set up a different PDU session via the data network name (DNN) approach.

Figure 15:
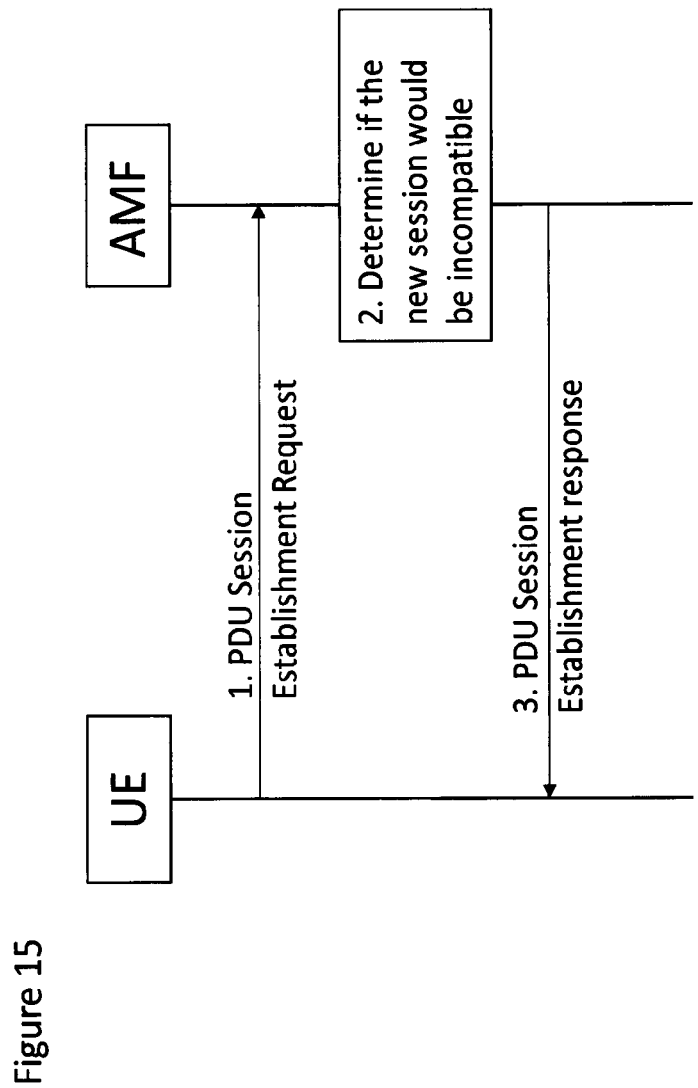
FIG. 15 shows another example of a signalling diagram between network functions.

As shown in FIG. 15, at step 1 a UE may provide a PDU session establishment request to an AMF. In other examples, the UE may provide another suitable request format.

At step 2, the AMF may determine if the PDU session would be compatible with the current network slices. For example, the AMF may check whether the hosting base station (S-RAN) supports determining a time difference between the control plane and the user plane during handover. If not, the PDU session establishment may not be continued.

If the UE requests to setup a PDU session for single network slice selection assistance information (S-NSSAI) which is incompatible with one of the slices of the already established PDU session, then the AMF may return for this S-NSSAI an indication back to the communications device. The indication may be provided in a response message carrying a corresponding DNN to be used. The response message may be provided back to the UE as shown in step 3.

On receipt of the PDU Session Establishment response message at the UE, which may be an accept, or a reject or a similar response, the UE may set up a separate PDU session with the DNN received for that S-NSSAI. The AMF may be configured with a mapping from any S-NSSAI/Slice ID to its corresponding DNN. Alternatively, the corresponding mapping may be stored at the network slice selection function (NSSF) and may be retrieved by the AMF from the NSSF.

In other embodiments different entities may be used to provide the functions of one or more of the entities shown in FIGS. 10 to 15.

In some embodiments, during a session establishment and with/after each service request and handover, the AMF or MME provides an estimation for the control plane delay between the AMF or MME and the base station or RAN.

Some embodiments may be used with a slicing concept, such as in 5G, where there is one single AMF for all slices. In some embodiments, the AMF, during the session establishment and with/after each service request and handover procedure, provides a new estimation, for each slice, for the control plane delay between the AMF and the RAN. For example, the AMF may provide a new estimation for the control plane delay for each PDU session in any slice in a 5G architecture. It should be appreciated that there may not be any network slices in a 4G architecture.

In another example, instead of one single MME/AMF at the centralized DC (data centre), distributed MMEs/AMFs are used for all slices and all UEs. This may mean that MMEs/AMFs may be relocated. This may be relatively frequently.

Thus, in some embodiments, by determining the time difference between control plane delays and user plane delays during a handover, user plane packets can be delayed by the determined time difference such that packet loss and/or additional buffering may be minimized at the target RAN.

If the network functions are compatible and are able to perform the procedure as shown in the example of FIG. 12, this may lead to reduced packet loss and reduced additional delay due to additional buffering at the target RAN during handover. The handover execution phase may be minimized as the SN information travels with the payload packets. The execution phase of the handover is reduced by the time difference between control plane delay and the user plane delay. This reduce in execution time can make a big improvement for ultra-reliable low latency (URLLC) scenarios.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone 5G networks, similar principles maybe applied in relation to other examples of standalone 3G or LTE networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A system comprising:
a control plane comprising:
a source mobility management function (S-AMF);
a target mobility management function (T-AMF); and
a session management function (SMF);
a user plane comprising a target user plane function (T-UPF);
a source radio access network (S-RAN);
a target radio access network (T-RAN);
an apparatus;
at least one processor; and
at least one memory including computer program code, the at least one memory and the computer program code configured to, with the at least one processor, cause the at least one processor to cause the following operations;
providing, by the S-RAN, a handover required message to the S-AMF;
providing, by the S-RAN, a second message indicating, to the S-AMF, that the S-RAN supports a procedure of a minimized preparation phase for handover and supports sending control information from a source base station to a target base station via the user plane;
upon receipt of the handover required message by the S-AMF:
selecting, by the S-AMF, the T-AMF to use for a handover; and
signaling, by the S-AMF, support of the procedure of the minimized preparation phase and of a direct data forwarding to the T-AMF;
determining, by the T-AMF, that the T-UPF supports the procedure of the minimized preparation phase;
based on the determining, providing, by the T-AMF, a combined create session request and create indirect forwarding indication message to the T-UPF via the SMF;
upon receipt of the combined create session request message and the create indirect forward message, providing, by the T-UPF to the T-AMF via the SMF, the combined create session request message and the create indirect forward message with an uplink address of the T-UPF and an indirect T-UPE internet protocol (IP) address and tunnel endpoint identifier (TEID);
upon receipt of the combined create session request message and the create indirect forward message at the T-AMF, transmitting, by the T-AMF, a handover request message with a RAN transparent container, the uplink address, the indirect T-UPF IP Address and TEID to the T-RAN;
transmitting, by the T-AMF, an indication to the T-RAN, that the T-AMF supports the procedure of the minimized preparation phase and of the direct data forwarding to the T-AMF;
upon receipt of the direct forwarding indication with the handover request message, providing, by the T-RAN, a handover request acknowledgment message directly to the S-RAN via the user plane; and
providing, by the S-RAN, a handover command message to the apparatus, the S-RAN configured to communicate as if the handover command message was received via the control plane rather than from the T-RAN directly via the user plane.

2. The system as claimed in claim 1, wherein the control information comprises sequence number information.

3. The system as claimed in claim 1, wherein the at least one memory and the computer program code are further configured to, with the at least one processor, cause the apparatus to cause a request message to be sent from the source base station to the target base station via a control plane.

4. The system as claimed in claim 1, wherein the S-RAN provides the RAN transparent container within the handover required message.

5. The system as claimed in claim 3, wherein the control plane further comprises:
a session management function (SMF);
a policy control function (PCF);
an authentication server function (AUSF);
a network slice selection function (NSSF);
a network exposure function (NEF);
a network function repository function (NRF); and
a unified data management (UDM).

6. The system as claimed in claim 1, wherein the at least one memory and the computer program code are further configured to, with the at least one processor, cause the at least one processor to cause the user plane to send the control information in-band along with payload packets in the user plane to the target base station directly.

7. The system as claimed in claim 6, wherein the at least one memory and the computer program code are further configured to, with the at least one processor, cause the at least one processor to cause the user plane to send the control information in-band along with payload packets in the user plane to the target base station directly in response to receiving the request acknowledgment message from the target base station.

8. The system as claimed in claim 1, wherein the at least one memory and the computer program code are further configured to, with the at least one processor, cause the at least one processor to cause an indication to be sent from the source base station to a network entity, wherein the indication provides information that the source base station supports sending of control information via the user plane.

9. A method comprising:
providing, by a source radio access network (S-RAN), a handover required message to a source mobility management function (S-AMF);
providing, by the S-RAN, a second message indicating, to the S-AMF, that the S-RAN supports a procedure of a minimized preparation phase for handover and supports sending control information via a user plane;
upon receipt of the handover required message by the S-AMF:
selecting, by the S-AMF, a target mobility management function (T-AMF) to use for a handover; and
signaling, by the S-AMF, support of the procedure of the minimized preparation phase and of a direct data forwarding to the T-AMF;
determining, by the T-AMF, that a target user plane function (T-UPF) supports the procedure of the minimized preparation phase;
based on the determining, providing, by the T-AMF, a combined create session request and create indirect forwarding indication message to the T-UPF via a session management function (SMF);
upon receipt of the combined create session request message and the create indirect forward message, providing, by the T-UPF to the T-AMF via the SMF, the combined create session request message and the create indirect forward message with an uplink address of the T-UPF and an indirect T-UPE internet protocol (IP) address and tunnel endpoint identifier (TEID);

upon receipt of the combined create session request message and the create indirect forward message at the T-AMF, transmitting, by the T-AMF, a handover request message with a RAN transparent container, the uplink address, the indirect T-UPF IP Address and TEID to a target radio access network (T-RAN);

transmitting, by the T-AMF, an indication to the T-RAN, that the T-AMF supports the procedure of the minimized preparation phase and of the direct data forwarding to the T-AMF;

upon receipt of the direct forwarding indication with the handover request message, providing, by the T-RAN, a handover request acknowledgment message directly to the S-RAN via the user plane; and providing, by the S-RAN, a handover command message to an apparatus, the S-RAN configured to communicate as if the handover command message was received via the control plane rather than from the T-RAN directly via the user plane.

10. The method according to claim 9, wherein the control information comprises sequence number information.

11. The method according to claim 9, wherein the at least one memory and the computer program code are further configured to, with the at least one processor, cause the apparatus to cause a request message to be sent from the source base station to the target base station via a control plane.

12. The method according to claim 9, wherein the S-RAN provides the RAN transparent container within the handover required message.

13. The method according to claim 9, wherein the control plane comprises the S-AMF, the T-AMF, and the SMF.

14. The method according to claim 9, wherein the user plane comprises the T-UPE.

15. A system comprising:
a control plane comprising:
a source mobility management function (S-AMF);
a target mobility management function (T-AMF); and
a session management function (SMF);
a user plane comprising a target user plane function (T-UPF);
a source radio access network (S-RAN);
a target radio access network (T-RAN);
an apparatus;
a plurality of processors; and
at least one memory including computer program code, the at least one memory and the computer program code configured to, with the plurality of processors, cause the following operations:
send, by the S-RAN, a handover required message to the S-AMF;
send, by the S-RAN, a second message indicating, to the S-AMF, that the S-RAN supports a procedure of a minimized preparation phase for handover and supports sending control information via the user plane;
upon receipt of the handover required message by the S-AMF:
select, by the S-AMF, the T-AMF to use for a handover; and
signal, by the S-AMF, support of the procedure of the minimized preparation phase and of a direct data forwarding to the T-AMF;
determine, by the T-AMF, that the T-UPF supports the procedure of the minimized preparation phase;
based on the determining, send, by the T-AMF, a combined create session request and create indirect forwarding indication message to the T-UPF via the SMF;
upon receipt of the combined create session request message and the create indirect forward message, send, by the T-UPF to the T-AMF via the SMF, the combined create session request message and the create indirect forward message with an uplink address of the T-UPF and an indirect T-UPE internet protocol (IP) address and tunnel endpoint identifier (TEID);
upon receipt of the combined create session request message and the create indirect forward message at the T-AMF, send, by the T-AMF, a handover request message with a RAN transparent container, the uplink address, the indirect T-UPF IP Address and TEID to the T-RAN;
send, by the T-AMF, an indication to the T-RAN, that the T-AMF supports the procedure of the minimized preparation phase and of the direct data forwarding to the T-AMF;
upon receipt of the direct forwarding indication with the handover request message, send, by the T-RAN, a handover request acknowledgment message directly to the S-RAN via the user plane; and
send, by the S-RAN, a handover command message to the apparatus, the S-RAN configured to communicate as if the handover command message was received via the control plane rather than from the T-RAN directly via the user plane.

16. A system as claimed in claim 15, wherein the control information comprises sequence number information.

17. A system as claimed in claim 15, wherein the at least one memory and the computer program code are further configured to, with the at least one processor, cause the apparatus to cause a request message to be sent from the source base station to the target base station via a control plane.

18. A system as claimed in claim 15, wherein the S-RAN provides the RAN transparent container within the handover required message.

19. A system as claimed in claim 18, wherein the control plane further comprises:
a session management function (SMF);
a policy control function (PCF);
an authentication server function (AUSF);
a network slice selection function (NSSF);
a network exposure function (NEF);
a network function repository function (NRF); and
a unified data management (UDM).

20. A system as claimed in claim 15, wherein the at least one memory and the computer program code are further configured to, with the plurality of processors, cause the user plane to send the control information in-band along with payload packets in the user plane to the target base station directly.

* * * * *